(12) United States Patent
Holder

(10) Patent No.: US 11,018,705 B1
(45) Date of Patent: May 25, 2021

(54) INTERFERENCE MITIGATION, TARGET DETECTION, LOCATION AND MEASUREMENT USING SEPARABLE WAVEFORMS TRANSMITTED FROM SPATIALLY SEPARATED ANTENNAS

(71) Applicant: Propagation Research Associates, Inc., Marietta, GA (US)

(72) Inventor: Ernest Jefferson Holder, Canton, GA (US)

(73) Assignee: Propagation Research Associates, Inc., Marietta, GA (US)

( * ) Notice: Subject to any disclaimer, the term of this patent is extended or adjusted under 35 U.S.C. 154(b) by 0 days.

(21) Appl. No.: 16/947,112

(22) Filed: Jul. 17, 2020

(51) Int. Cl.
*H04B 1/04* (2006.01)
*H04B 7/185* (2006.01)
*H04B 7/08* (2006.01)

(52) U.S. Cl.
CPC ......... *H04B 1/0475* (2013.01); *H04B 1/0483* (2013.01); *H04B 7/0857* (2013.01); *H04B 7/1855* (2013.01)

(58) Field of Classification Search
CPC .. H04B 7/0413; H04B 7/0854; H04B 1/0475; H04B 1/0483; H04B 7/0857;
(Continued)

(56) References Cited

U.S. PATENT DOCUMENTS 3,720,942 A 3/1973 Wilmot et al.
4,296,894 A 10/1981 Schnabele
(Continued)

FOREIGN PATENT DOCUMENTS

DE 102004003304 B3 3/2014
ES 2449266 T3 3/2014
(Continued)

OTHER PUBLICATIONS

Scharff, L. et al.; Blind Adaptation of Zero Forcing Projections and Oblique Psuedo-Inverses for Subspace Detection and Estimation When Interference Dominates Noise; IEEE Transactions on Signal Processing, Dec. 2002, pp. 2938-2946, vol. 50, No. 12. IEEE.
(Continued)

*Primary Examiner* — Rahel Guarino
(74) *Attorney, Agent, or Firm* — Robert A. Blaha; Smith Tempel Blaha LLC

(57) ABSTRACT

A system includes a set of spatially separated transmit antenna elements (SSTAE) broadcasting uniquely identifiable waveforms, a set of spatially separated receive antenna elements (SSRAE) and at least one circuit assembly. The at least one circuit assembly is electrically coupled to the SSRAE, which provide respective electrical signals responsive to the uniquely identifiable waveforms. The electrical signals include at least one target signal and electromagnetic interference. The circuit assembly operates on the electrical signals to create a matched projection space parallel to a reference related to the at least one target signal and a second projection space that is orthogonal or nearly orthogonal to the matched projection space. The second projection space includes the electromagnetic interference but not the at least one target signal. The circuit assembly uses the second projection space and the matched projection space to separate the electromagnetic interference from the at least one target signal.

20 Claims, 15 Drawing Sheets

(58) Field of Classification Search
CPC .... H04B 7/1855; H04B 7/024; H04B 1/7107; H04B 2201/709718; H04B 7/04; H04L 2025/03426
See application file for complete search history.

(56) References Cited

U.S. PATENT DOCUMENTS

| | | | |
|---|---|---|---|
| 4,486,756 A | 12/1984 | Peregrim et al. | |
| 4,713,664 A | 12/1987 | Taylor, Jr. | |
| 4,845,500 A | 7/1989 | Cornett et al. | |
| 5,252,980 A | 10/1993 | Gray et al. | |
| 5,260,709 A | 11/1993 | Nowakowski | |
| 5,465,095 A | 11/1995 | Bryant | |
| 5,515,061 A | 5/1996 | Hiltz | |
| 5,855,339 A | 1/1999 | Mead | |
| 5,949,364 A | 9/1999 | Katzberg et al. | |
| 6,232,922 B1 | 5/2001 | McIntosh | |
| 6,529,821 B2 | 3/2003 | Tomasi | |
| 6,580,978 B1 | 6/2003 | McTamaney | |
| 6,697,633 B1 | 2/2004 | Dogan et al. | |
| 6,710,743 B2 | 3/2004 | Benner et al. | |
| 6,711,219 B2 | 3/2004 | Thomas et al. | |
| 6,744,408 B1 | 6/2004 | Stockmaster | |
| 6,822,606 B2 | 11/2004 | Ponsford et al. | |
| 6,856,945 B2 | 2/2005 | Thomas et al. | |
| 6,867,731 B2 | 3/2005 | Dizaji et al. | |
| 7,099,377 B2 | 8/2006 | Berens et al. | |
| 7,110,434 B2 | 9/2006 | Currivan et al. | |
| 7,120,657 B2 | 10/2006 | Ricks et al. | |
| 7,136,410 B2 | 11/2006 | Choi et al. | |
| 7,151,478 B1 | 12/2006 | Adams | |
| 7,151,483 B2 | 12/2006 | Dizaji et al. | |
| 7,167,884 B2 | 1/2007 | Picciolo et al. | |
| 7,177,351 B2 | 2/2007 | Kadous | |
| 7,333,919 B2 | 2/2008 | Hayward et al. | |
| 7,359,465 B2 | 2/2008 | Olson et al. | |
| 7,379,515 B2 | 5/2008 | Johnson et al. | |
| 7,420,509 B2 | 9/2008 | Minkoff | |
| 7,430,253 B2 | 9/2008 | Olsen et al. | |
| 7,463,609 B2 | 12/2008 | Scharf et al. | |
| 7,554,508 B2 | 6/2009 | Johnson et al. | |
| 7,570,211 B1 | 8/2009 | Jensen et al. | |
| 7,626,542 B2 | 12/2009 | Kober et al. | |
| 7,643,538 B2 | 1/2010 | Currivan et al. | |
| 7,660,231 B2 | 2/2010 | Tulino | |
| 7,834,807 B2 | 11/2010 | Chang | |
| 7,873,097 B1 | 1/2011 | Luecke et al. | |
| 7,903,024 B2 | 3/2011 | Tietjen et al. | |
| 7,907,912 B2 | 3/2011 | Nam et al. | |
| 8,120,526 B2 | 2/2012 | Holder | |
| 8,121,177 B2 | 2/2012 | Narayan et al. | |
| 8,260,209 B2 * | 9/2012 | Sanayei | H04B 7/0634 455/67.11 |
| 8,274,425 B2 | 9/2012 | Yeary et al. | |
| 8,363,768 B2 | 1/2013 | Patino-Studencka et al. | |
| 8,610,041 B1 | 12/2013 | Boardman | |
| 8,694,030 B2 | 4/2014 | Campbell et al. | |
| 8,854,252 B2 | 10/2014 | Holder | |
| 8,874,477 B2 | 10/2014 | Hoffberg | |
| 9,103,910 B2 | 8/2015 | Holder | |
| 9,215,012 B2 | 12/2015 | Holder et al. | |
| 9,401,741 B2 | 7/2016 | Holder et al. | |
| 9,529,078 B2 | 12/2016 | Holder | |
| 9,696,418 B2 | 7/2017 | Holder | |
| 10,571,224 B2 | 2/2020 | Holder | |
| 2002/0152253 A1 | 10/2002 | Ricks et al. | |
| 2002/0197958 A1 | 12/2002 | Collins et al. | |
| 2003/0098697 A1 | 5/2003 | Tanaka | |
| 2003/0189972 A1 | 10/2003 | Berens et al. | |
| 2003/0198305 A1 | 10/2003 | Taylor et al. | |
| 2003/0210179 A1 | 11/2003 | Dijazi et al. | |
| 2004/0017867 A1 | 1/2004 | Thomas | |
| 2004/0151235 A1 | 8/2004 | Olson et al. | |
| 2004/0178951 A1 | 9/2004 | Ponsford et al. | |
| 2005/0007278 A1 | 1/2005 | Anson et al. | |
| 2005/0180364 A1 | 8/2005 | Nagarajan et al. | |
| 2005/0195103 A1 | 9/2005 | Davis et al. | |
| 2005/0242985 A1 | 11/2005 | Ponsford et al. | |
| 2005/0253579 A1 | 11/2005 | Block et al. | |
| 2006/0153283 A1 | 7/2006 | Scharf et al. | |
| 2006/0163422 A1 | 7/2006 | Krikorian | |
| 2006/0229051 A1 | 10/2006 | Narayan et al. | |
| 2006/0238403 A1 | 10/2006 | Golan | |
| 2008/0007454 A1 | 1/2008 | Minkoff | |
| 2008/0291083 A1 | 11/2008 | Chang | |
| 2009/0109086 A1 | 4/2009 | Krieger et al. | |
| 2009/0122866 A1 | 5/2009 | Crawford et al. | |
| 2009/0141775 A1 | 6/2009 | Kober et al. | |
| 2009/0160707 A1 | 6/2009 | Lakkis | |
| 2009/0322614 A1 | 12/2009 | Na et al. | |
| 2011/0069796 A1 | 3/2011 | Scharf et al. | |
| 2012/0016921 A1 | 1/2012 | Davenport et al. | |
| 2012/0249361 A1 | 10/2012 | Sahinoglu et al. | |
| 2015/0143982 A1 | 5/2015 | Rovinsky | |
| 2016/0320165 A1 | 11/2016 | Rovinsky | |

FOREIGN PATENT DOCUMENTS

| | | |
|---|---|---|
| WO | 9742520 A1 | 11/1997 |
| WO | 2007016098 A2 | 2/2007 |
| WO | 2013163629 A1 | 10/2013 |

OTHER PUBLICATIONS

Affes, S. et al. ; Interference Subspace Rejection: A Framework for Multiuser Detection in Wideband CDMA, IEEE Journal on Selected Areas in Communications, Feb. 2002, pp. 287-302, vol. 20, No. 2, IEEE.

Landon, J. et al.; Model-Based Subspace Projection Beamforming for Deep Interference Nulling, IEEE Transactions on Signal Processing, Mar. 2012; pp. 1215-1228, vol. 60, No. 3, IEEE.

Schmidt, R.O., Multiple Emitter Location and Signal Parameter Estimation, IEEE Transactions on Antennas and Propagation, Mar. 1986, pp. 276-280, vol. AP-34, No. 3, IEEE.

Buckley, K.M.; Spatial/Spectral Filtering With Linearly Contained Minimum Variance Beamformers, IEEE Transactions on Acoustics, Speech and Signal Processing, Mar. 1987, pp. 249-266, vol. ASSP-35, No. 3, IEEE.

Goldstein, J.S. et al.; Theory of Partially Adaptive Radar, IEEE Transactions on Aerospace and Electronics Systems, Oct. 1997, pp. 1309-1325, vol. 33, No. 4, IEEE.

Brennan, L.E. et al.; Theory of Adaptive Radar, IEEE Transactions on Aerospace and Electronics Systems, Mar. 1973, pp. 237-252, vol. 9, No. 2, IEEE.

* cited by examiner

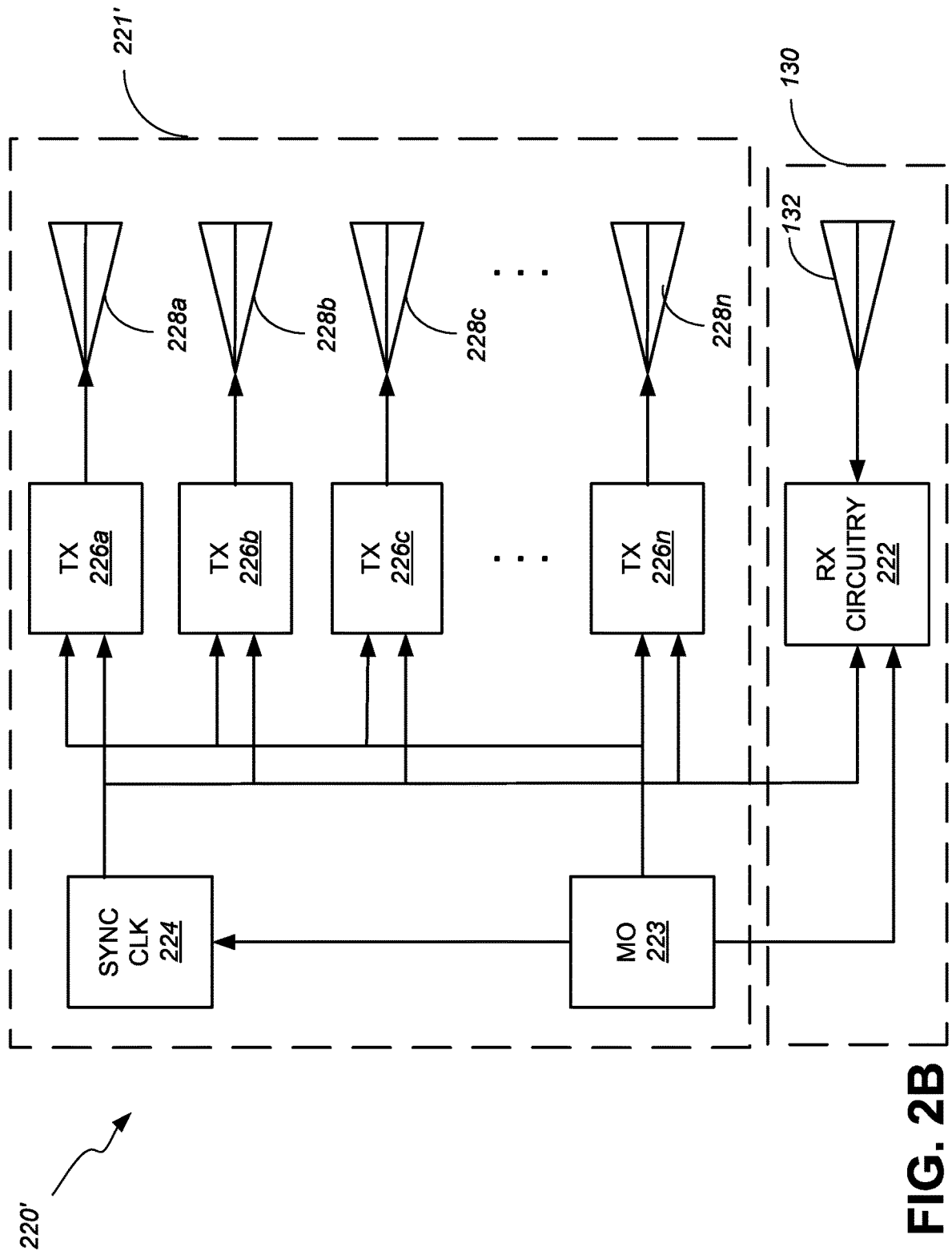

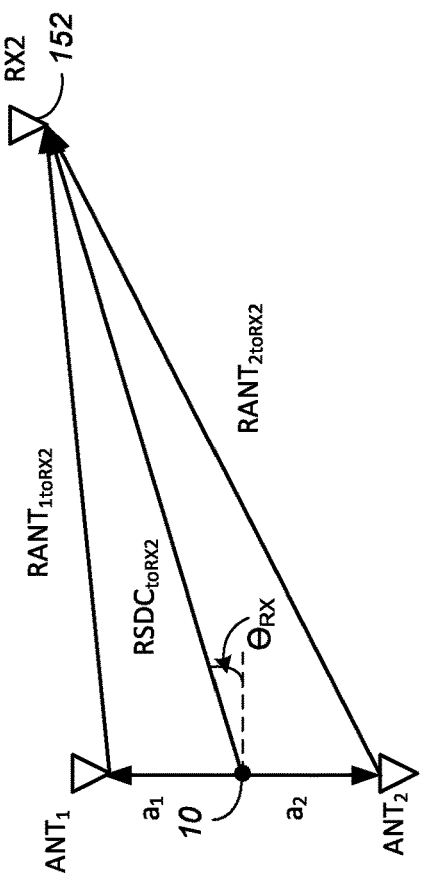
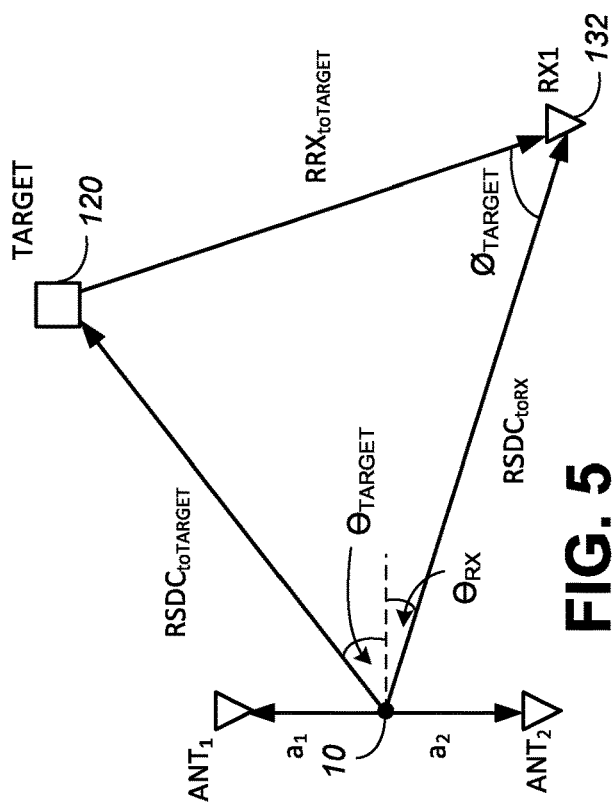
FIG. 6
FIG. 5

INTERFERENCE MITIGATION, TARGET DETECTION, LOCATION AND MEASUREMENT USING SEPARABLE WAVEFORMS TRANSMITTED FROM SPATIALLY SEPARATED ANTENNAS

TECHNICAL FIELD

The invention relates to systems and methods for target detection and measurement in environments with interference in electromagnetic signals.

BACKGROUND

Radio-frequency reference signals that are transmitted and reflected by various features in an environment have been used to both detect and determine information concerning the motion (if any) of a detected target with respect to a transmitter. Some radio detection and ranging systems commonly referred to as radars are used to detect and locate one or more reflective and possibly non-cooperative objects or targets. While the physical limits of detection and ranging may be well understood and characterized through mathematical tools such as the radar range equation, often other considerations play a large part in the success of a given radar system design in accomplishing these goals.

Various radar techniques are currently used to determine the position of a target using range and angle determination systems. Examples include the mono-static radar, multi-static radar and interferometric radar. The monostatic radar, which uses the oldest of the techniques, was developed in the 1920s as a method that calculates the range to a target by determining the time it takes for an echo of a transmitted pulse to return to a receiver complex and dividing by the speed of light. An angle determination is made by observing the direction in which the transmitter and receiver aperture are pointing when a target signal is at its maximum amplitude. There are many refinements possible over this basic technique including: 1) using coherent processing of the received reflections to more precisely determine the range; 2) using phased-array apertures, which include not one but a plurality of elements, to steer and monitor the transmitted beam electronically instead of mechanically (thereby allowing for mono-pulse angular determination, which improves angle estimation); and 3) pulse compression, which allows for relatively longer in duration low-power pulses to replace relatively higher-power and shorter in duration pulses resulting in a reduction of transmitter costs.

Multi-static radar typically includes a bistatic configuration where a single transmitter and a single receiver are separated by a known distance. Using the same timing techniques as those that are used in the mono-static radar case, the range and angle to the target can be determined. However, the angular accuracy is improved due to the separation distance between the transmitter and receiver.

Interferometric radars have been more recently developed to utilize a single transmitter and multiple receivers with phase comparisons of the signal reflections received at each receiver to determine range and angle to the target relatively more precisely.

Current radar designs sometimes suffer performance degradation when faced with tasks such as tracking and/or detecting a large number of targets at one time due to the radar's resources being overwhelmed. Other problems such as multipath interference, which can make practical detection impossible, and accurate angular position determination, which may be required for high-precision tracking over relatively brief time periods, can also be difficult to achieve. Each of these difficulties can be overcome to some extent by replication of radar resources, more sophisticated processing, and/or the addition of more radiative power.

Those skilled in the art will recognize that sparse arrays have been researched for applications in radar, sonar and geophysics. Such studies have contemplated methods for identifying a maximum resolution with a minimal number of elements using the coarray as a measure of performance. The coarray is generally defined as the correlation of the aperture of an array. The coarray is also the inverse Fourier transform of the far-field beam pattern of the array. When designing the array for high resolution, generally a coarray is as uniform as possible over the span of the maximum number of lags. Thus, a desired coarray is typically equal to the number of elements for lag zero and unity for other lags. Research has shown that such coarrays are not achievable for arrays with greater than four elements. However, approximations to this ideal have led to the concepts of minimum redundancy arrays and non-redundant minimum missing lag arrays. Several researchers have also investigated ways to control sidelobe levels for sparse arrays.

In light of the issues discussed above, it is desirable to provide an improved radar system that may overcome at least some of the disadvantages described above while avoiding hardware replication, processing delays and/or the addition of radiative power.

SUMMARY

Improved systems for mitigating interference with minimal resources are disclosed. In some embodiments, a common coordinate system consisting of at least two orthogonal axes is used to avoid the above-described complexities in determining a location and motion of a reflective target. Some applications define and apply a two-axis coordinate system to describe position, motion and orientation, while some other applications will call for a common coordinate system consisting of a three-axis coordinate system. Such a three-axis coordinate system will consist of three orthogonal (or substantially orthogonal) axes.

The improved systems include a set of spatially separated transmit antenna elements (SSTAE), a set of spatially separated receive antenna elements (SSRAE) and a circuit assembly electrically coupled to the SSRAE. The SSTAE includes at least T members transmitting T unique waveforms, where T is a positive integer greater than or equal to two. The SSRAE includes at least R members receiving the T unique waveforms, where R is a positive integer greater than or equal to two. The circuit assembly is electrically coupled to the SSRAE. The R members of the SSRAE provide respective electrical signals responsive to the T unique waveforms. The respective electrical signals include at least one target signal and electromagnetic interference when both are present. The circuit assembly operates on the respective electrical signals to generate a matched projection space parallel to a reference related to the at least one target signal and a second projection space that is orthogonal or nearly orthogonal to the matched projection space. The second projection space includes the electromagnetic interference but not the at least one target signal. The circuit assembly uses the second projection space and the matched projection space to separate the electromagnetic interference from the at least one target signal.

Another example embodiment includes a method for mitigating electromagnetic interference. The method includes providing an array of transmit antenna elements where each transmit antenna element transmits uniquely identifiable waveforms; providing an array of receive antenna elements electrically coupled to processing circuits that receive an electrical signal from at least one of the receive antenna elements, the electrical signal including a target signal and at least one interference signal, where the target signal is a reflected version of the uniquely identifiable waveforms; performing a first projection operation on the electrical signal to create a matched projection space parallel to a reference related to the uniquely identifiable waveforms and a second projection operation on the electrical signal to create an orthogonal projection space that is orthogonal to, or nearly orthogonal to, the matched projection space, the orthogonal projection space including the interference signal, but not the target signal; and using one of the processing circuits to separate the interference signal from the target signal.

Another example embodiment includes a non-transitory computer-readable medium having code stored thereon for execution by a processor in a sensor system, the computer-readable medium including information identifying a set of spatially separated transmit antenna elements (SSTAE) or SSTAE information, information identifying a set of spatially separated receive antenna elements (SSRAE) or SSRAE information, reference vector information and logic for generating a projection space, a separation space, and for transforming the separation space into a representation of a reflected version of a target signal from the electromagnetic energy received by the SSRAE. The SSTAE information associating a uniquely identifiable waveform and a location of a corresponding transmit antenna element for the members of the set of SSTAE. The SSRAE information associating a location of a corresponding receive antenna element. The reference vector information identifying a direction that is substantially parallel to a characteristic of the uniquely identifiable waveforms. The logic for generating a projection space when executed by a circuit assembly operates on an electrical representation of the respective electromagnetic energy signals received by the SSRAE to create a matched projection space parallel to the reference vector, the matched projection space including a representation of a reflected version of the respective uniquely identifiable waveforms and for generating a mismatched projection space substantially orthogonal to the reference vector, the mismatched projection space including interference but not the reflected version of the respective uniquely identifiable waveforms. The logic for generating the separation space responsive to the matched projection space and the mismatched projection space. The logic for generating a representation of the reflected version of the target signal generates an image space where the target signal can be detected.

A further example embodiment is a system for target location and interference cancellation using minimal antenna resources, the system includes processing circuits electrically coupled to transmit antenna elements, and processing circuits electrically coupled to receive antenna elements. The processing circuits coupled to the transmit antenna elements configured to send an electrical signal to at least one of the transmit antenna elements, where each of the transmit antenna elements transmit unique waveforms. The processing circuits electrically coupled to the receive antenna elements receiving an electrical signal from at least one of the receive antenna elements, the electrical signal including at least one target signal and at least one interference signal and performing a first projection operation on the electrical signal to create a matched projection space parallel to a reference related to a target signal and a second projection operation on the electrical signal to create an orthogonal projection space that is orthogonal to, or nearly orthogonal to, the matched projection space, the orthogonal projection space including the interference signal, but not the target signal, wherein the at least one target signal is a reflected version of one of the unique waveforms, and at least one of the processing circuits coupled to the receive antenna elements uses the orthogonal projection space and the matched projection space to separate the interference signal from the target signal.

BRIEF DESCRIPTION OF THE DRAWINGS

Improved systems, methods and computer-readable media can be better understood with reference to the following drawings. Components and distances between components in the drawings are not necessarily to scale, emphasis instead being placed upon clearly illustrating the principles involved.

FIG. 2B is a schematic diagram illustrating an alternative embodiment of the SDA of FIG. 1.

FIG. 5 is a schematic diagram that illustrates the manner in which the position and orientation of a target or non-cooperative object relative to the receiver of FIG. 1 can be determined in two dimensions.

FIG. 6 is a schematic diagram that illustrates the manner in which the position and orientation of the second receiver relative to the SDA of FIG. 1 can be determined in two dimensions.

DETAILED DESCRIPTION OF EMBODIMENTS

Figure 1:
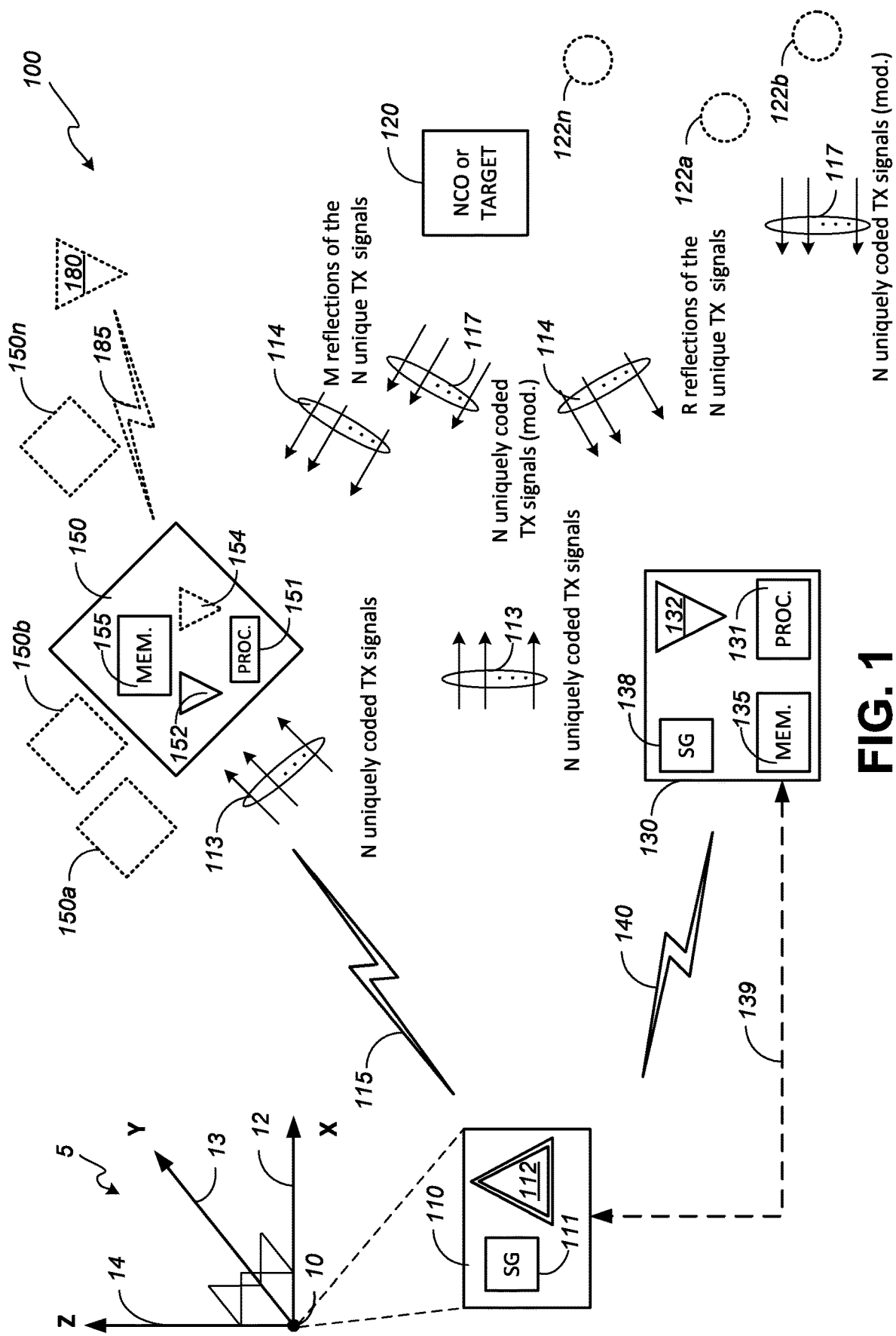
FIG. 1 is a functional block diagram of an example embodiment of an environment in which a sensor system uses coded signals to guide a platform or platforms relative to a non-cooperative object or target.

In prior art systems that deployed a single transmitter separated from two receivers, an additional receiver would be necessary to provide the required degrees of freedom to be sufficient to both reduce interference from a jammer and to perform a target angle measurement.

In accordance with illustrative or example embodiments described herein, waveform separability is applied in conjunction with interferometry from two or more physically separated transmit sources to enable an improved system capable of both reducing interference and determining angle of arrival from an illuminated target. Such an improved system includes an integer number of physically separated transmit sources where each transmit source is associated with a uniquely identifiable waveform that can be separated from a composite signal received at two or more physically separated receivers. Waveform separability can be considered as achieving near orthogonality among pulses that make up the T waveforms, where T is an integer equal to or greater than two. A measure of orthogonality is determined from the output of filters that are both matched and mismatched to the pulse structure. Orthogonality can be achieved in frequency, phase, time or polarization diversity. The separable waveform pulses are sent simultaneously from each member of the set of spatially separated transmit antenna elements (SSTAE).

Stated another way, a transmit subsystem consists of two or more distributed transmit antenna elements that transmit coherent and distinct waveforms from each of the separate transmit antenna elements. The separable waveform pulses may be steered or otherwise adjusted to direct the transmitted pulses in a coordinated manner to a select sector of a volume to be scanned. When the separable waveform pulses encounter a reflective surface of a target or targets in the select sector of the volume to be scanned, some of the electromagnetic energy present in the coherent transmitted waveform pulses incident upon the target(s) is reflected toward each member of a set of spatially separated receive antenna elements that are separated both from each other and preferably but not necessarily separated spatially from the SSTAE. This altered interferometer architecture reduces the number of receivers or received signal resources that would otherwise be required to perform interference cancellation and target measurements (e.g., range, angle of incidence or target angle).

The set of spatially separated receive antenna elements (SSRAE) consists of two or more antenna elements where the circuit assemblies processing the received signals are coherent with each other. One or more circuit assemblies operate on the received composite electrical signals. These composite electrical signals responsive to the T unique waveforms may include at least one target signal and electromagnetic interference. The one or more circuit assemblies operate on the respective electrical signals to create a matched projection space parallel to a reference vector related to the at least one target signal and operate on the respective electrical signals to create a second or mismatched projection space that is orthogonal or nearly orthogonal to the matched projection space, the second projection space including the electromagnetic interference but not the at least one target signal. The one or more circuit assemblies use the matched projection space and the mismatched projection space to separate the electromagnetic interference from the at least one target signal. Once separated, the results are transformed to recover a signal from an image space.

As long as the source of the electromagnetic interference is not well matched to the set of unique waveforms, the improved systems and methods will reduce and may effectively eliminate adverse effects from an active jammer with unknown signal characteristics. In addition, the improved systems and methods can be applied to mitigate clutter interference when the clutter and target Doppler frequencies are discrete and disjoint from each other in the Doppler spectrum.

The distributed system described above can be adapted such that unique waveforms from T SSTAE are used to determine a target angle and R unique waveforms at the SSRAE are used to cancel the electromagnetic interference.

The distributed system can be adapted to operate on the respective electrical signals from the receive antenna arrays to create a matched projection space that defines a sequence of range resolution cells over a range window.

The distributed system can be adapted to direct the T SSTAE to transmit a sequence of T unique waveforms that are used for Doppler processing in the circuit assembly electrically coupled to the set of SSRAE.

The circuit assembly coupled to the set of SSRAE can be adapted to separate the electromagnetic interference from the target signal prior to formation of an image space.

The circuit assembly coupled to the set of SSRAE can be adapted to separate electromagnetic interference from the target signal after formation of an image space.

As stated above, the SSTAE may or may not be co-located with the SSRAE.

The distributed system can be adapted to deploy code division multiple access techniques where a matched projection space and a second projection space are based on code division multiple access time slots.

Furthermore, the distributed system can be adapted to deploy time division multiple access techniques where a matched projection space and a second projection space are based on time division multiple access time slots.

Moreover, the distributed system can be adapted to deploy frequency division multiple access techniques where a matched projection space and a second projection space are based on frequency division multiple access frequencies.

The circuit assembly coupled to the set of SSRAE can be adapted to determine a covariance from the second projection space to cancel the electromagnetic interference.

The circuit assembly coupled to the set of SSRAE can be adapted to execute a minimum variance distortionless response over the second projection space to cancel interference.

The circuit assembly coupled to the set of SSRAE can be adapted to execute a generalized sidelobe cancellation over the second projection space to cancel interference.

The circuit assembly coupled to the set of SSRAE can be adapted to use relative phase of the received versions of the unique waveforms to cancel the electromagnetic interference.

The distributed system described above can be arranged to use a separation space defined by an angle-of-arrival and to localize interference in the angle-of-arrival.

Additionally or alternatively, the distributed system described above can be arranged to use a separation space defined by Doppler frequencies and to localize electromagnetic interference in Doppler frequencies.

The distributed system described above can be arranged to identify a target detection signal responsive to signal power relative to the sum of a noise floor over a select frequency spectrum and an interference power at members of the SSRAE.

In an alternative embodiment, a system for target location and interference cancellation using minimal antenna resources is provided. The system includes a spatially-distributed architecture (SDA) of transmit antenna arrays, the SDA having at least N members of antenna arrays spatially separated from each other, the N members transmitting uniquely coded signals, respectively, where N is an integer greater than or equal to two, a position and orientation of the antenna arrays of the SDA identifying a preferred coordinate system consisting of at least two orthogonal axes; a spatially-distributed architecture (SDA) of receive antenna arrays, the SDA having at least M members of antenna arrays spatially separated from each other, each of the M members receiving the N uniquely coded signals, respectively, where M is an integer greater than or equal to two, the receiver array receiving reflections of the uniquely coded signals reflected by a non-cooperative object and receiving M−1 or less number of intentional and nonintentional undesirable signal interference sources; a processor in communication with the receive antenna array, wherein M processing circuits electrically coupled to the M receive antenna elements, the M processing circuits receiving an electrical signal from at least one of the M receive antenna elements, the electrical signal including at least one target signal and at least one interference signal and performing a first projection operation on the electrical signal to create a matched projection space parallel to a reference related to a target signal and a second projection operation on the electrical signal to create an orthogonal projection space that is orthogonal to, or nearly orthogonal to, the matched projection space, the orthogonal projection space including the interference signal, but not the target signal, where at least one of the M processing circuits uses the orthogonal projection space and the matched projection space to separate the interference signal from the target signal, determine at least a position of the non-cooperative object in the preferred coordinate system based on the reflections of the uniquely coded signals while canceling the at least one number of intentional and non-intentional undesirable signal interference sources.

The system can be adapted to direct the processor to use electrical signals from the receive antenna arrays to determine one or more of the position, motion, and orientation of the non-cooperative object in the preferred coordinate system.

The system can be arranged such that the antenna elements for the transmit array and the receive array are collocated.

The system can be arranged to identify reflections of the uniquely coded signals from multiple unknown sources.

The system can be adapted to deploy M receive elements to cancel M−1 undesirable interference sources.

The system can be further adapted to deploy at least 2 total transmit antenna elements to track at least one non-cooperative target in one angular dimension.

The system may be further adapted to deploy at least 3 total number of transmit elements to track at least one non-cooperative target in two angular dimensions.

The system and more particularly the processor may be adapted to use interferometric phase differences among M distributed receive antennas receiving the N uniquely coded signals to determine that target angular location in the first coordinate system.

The processor may be further adapted to use signal time-of-arrival of one or more of the N uniquely coded signals received at one or more of the M number of distributed receive antennas to determine the total distance from the transmit array to the target and back to the receive array.

The above-described systems may be arranged such that M number of receive array antennas are remotely located on a platform and the N number of transmit array antennas are located elsewhere other than the platform.

When so arranged, the M number of receive array antennas are used to locate a non-cooperative target in the presence of M−1 or less number of interference sources for the purpose of guiding the platform relative to the position of the target.

Figure 12:
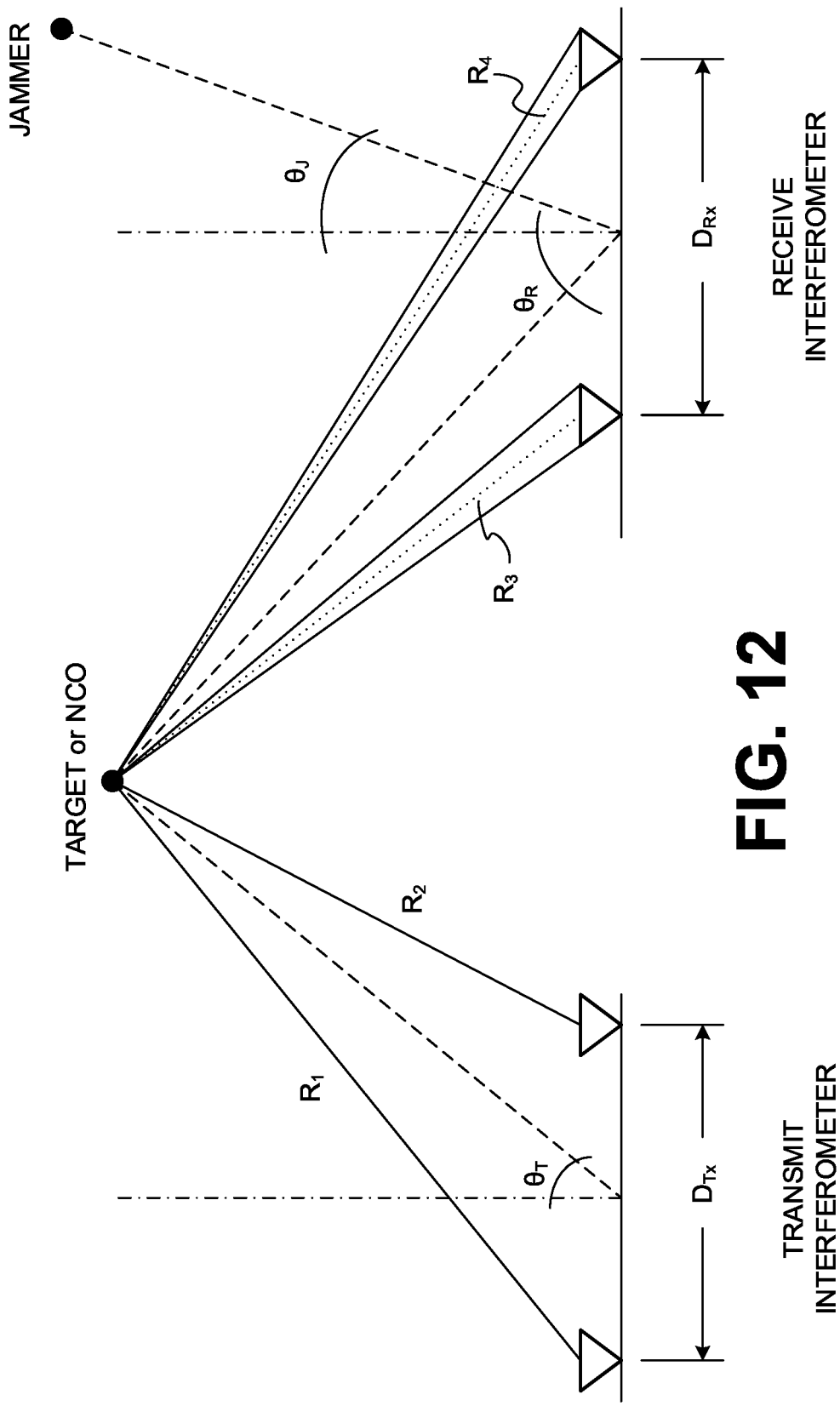
FIG. 12 is a schematic diagram of a bistatic interferometer.

As indicated in FIG. 12 the target can be located in accordance with a range equation calculation and at an angle with respect to the center of the SSTAE. For a bistatic interferometer with 2 transmit antennas and 2 receive antennas it is possible to the locate the target in angle and to cancel one jammer. Furthermore, the improved system can locate the jammer in accordance with a range equation calculation and with respect to an angle with respect to the center of the SSRAE.

In contrast, a conventional distributed transmit/receive array with $N_{conv}$ total transmit and receive antennas can spatially determine $M_T$ targets and cancel $M_J$ jammers where $M_T+M_J=N_{Conv}-1$. However, a bistatic orthogonal interferometer in accordance with the present invention uses T+1 transmit antennas and R+1 receive antennas. Thus, a bistatic orthogonal interferometer with two transmit antennas and two receive antennas is capable of measuring an angle of arrival for one target and cancelling one jammer. For a conventional distributed array to accomplish this task $N_{conv}=M_T+M_J+1$ total antennas are required, whereas for the bistatic orthogonal interferometer a total of $N_{BOI}=M_T+M_J\pm2$ are deployed. Thus, in comparison, one additional antenna is deployed in the SSRAE to achieve the advantage of being capable of cancelling $M_J$ jammers while determining an angle for any number of targets. However, in exchange for the additional receive antenna and the increase in the complexity of the signal transmit system (i.e., the electronics and structures associated with the SSTAE) the bistatic orthogonal interferometer cancels $M_J$ jammers and determines an angle for any number of targets, which reduces the complexity of the electronics and structures associated with the SSRAE. It should be understood that when more than two transmit antennas and more than two receive antennas are deployed in the respective array, the array becomes a distributed sparse array.

Orthogonal Space Projection

The Orthogonal Space Projection (OSP) digital signal processing technique mitigates the effects of interference using covariance matrices that are computed using either pre-compression (prior to Doppler processing) or post-compression (after Doppler processing) samples over a single compression interval. The OSP technique accomplishes both detection and parameter estimation in parallel as opposed to a conventional serial detection and estimation process, and thus, only requires a single compression interval for interference cancellation.

Figure 13:
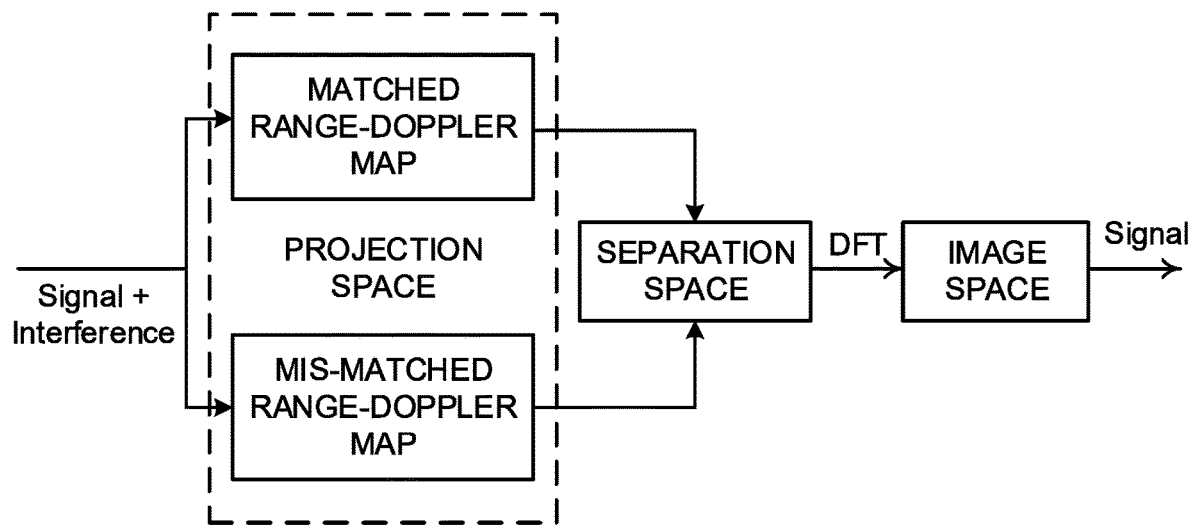
FIG. 13 is a schematic diagram illustrating a general OSP technique for mitigating interference.

The OSP process essentially creates an orthogonal subspace analogous to a conventional side-lobe canceller blocking matrix that contains only the interference sources and is mis-matched to the signal of interest. FIG. 13 shows the fundamental flow diagram for a general OSP technique. The matched and mis-matched channels are developed over a single compression interval to compress the signal in the matched channel and eliminate the signal in the mis-matched channel. The mis-matched subspace contains only the interference and receiver noise while the matched subspace contains the signal of interest plus interference (when present) and receiver noise. The performance of the OSP process generally depends upon the magnitude of the correlation between the matched and mis-matched projection operators. The output of each channel is combined using an adaptive canceller to create a separation space where the signal of interest is separated from that interference. A Discrete Fourier Transform (DFT) maps the projection-separation product space into an image space where detection and parameter estimation can be accomplished. For specific application to range-angle, the separation space is defined as angle-of-arrival, but OSP can be applied to other applications such as range-Doppler using Doppler as the separation space for distributed clutter mitigation and Doppler-range for discrete clutter mitigation.

Figure 14:
FIG. 14 is a schematic diagram illustrating that orthogonal space projection (OSP) cancellation can be commuted with OSP processing.
Figure 14:
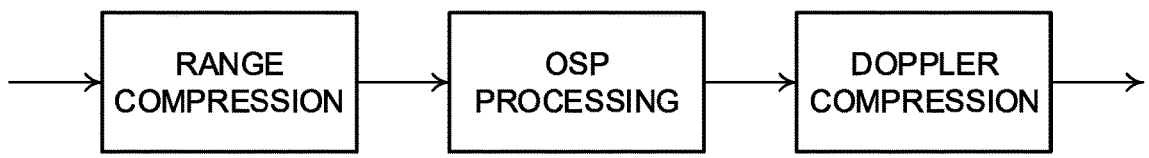
Figure 15:
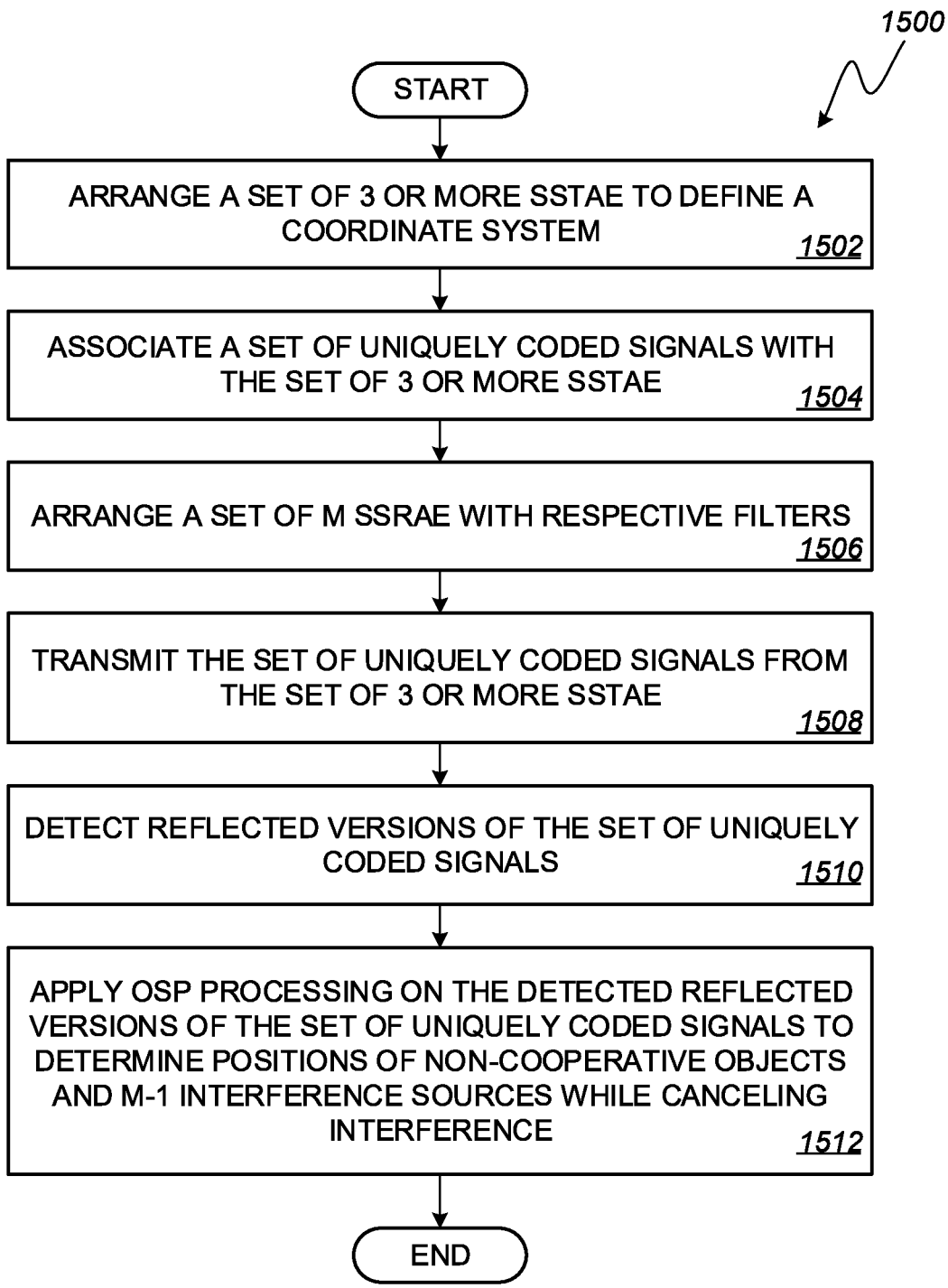
FIG. 15 is a flow diagram illustrating an example embodiment of a method for arranging and using a distributed bistatic interferometer with minimal antenna resources.

As illustrated in FIG. 14 orthogonal space projection (OSP) cancellation can be commuted with OSP processing. For example, a first example processing sequence may include Range Compression, Doppler Compression and OSP processing in that order. Alternatively, in a second example processing sequence, Range Compression may be performed before OSP processing with Doppler Compression completing the process.

The above has the following technological advantage in reducing the number of antennas in a non-collocated distributed array to locate one target in a 3-D coordinate frame while canceling M interference sources.

TABLE 1

| 2-D Angle | Number of Interference Sources | Transmit Antennas | Receive Antennas | Total Antennas |
| --- | --- | --- | --- | --- |
| Non-Collocated Orthogonal Interferometer | M − 1 | 3 | M | M + 3 |
| Non-Collocated Conventional Interferometer | M − 1 | 1 | 3M | 3M + 1 |

The distribution of antenna arrays in a coordinate space of interest will provide enhanced angle accuracy as well. Here, a distributed array means that the antenna separation is significantly larger than the separation of a contiguous array with a large field of regard. The relatively large separation of the antenna arrays from one another reduces the unambiguous field of regard while increasing the number of ambiguous angular locations as it does in any interferometer system. As such, higher angle accuracy comes at the cost of determining the exact angle location among the number of ambiguous locations.

The above-described arrangements and processing techniques achieve high angle accuracy while canceling interference sources using a minimal number of antennas.

TABLE 2

| 1-D Angle | Number of Interference Sources | Transmit Antennas | Receive Antennas | Total Antennas |
| --- | --- | --- | --- | --- |
| Non-Collocated Orthogonal Interferometer | M − 1 | 2 | M | M + 2 |
| Non-Collocated Conventional Interferometer | M − 1 | 1 | 2M | 2M + 1 |

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

An environment 100 in which an example embodiment of an improved tracking and/or guidance system operates is illustrated in FIG. 1. The improved tracking and/or guidance system includes a spatially-distributed architecture (SDA) or signal generation sub-system 110 that is separated or remotely located from a non-cooperative object or target 120. In the illustrated embodiment, the SDA 110 is arranged or located to the same side of each of the non-cooperative object or target 120, a cooperative object 122, a receiver subsystem or first receiver 130, a platform 150, as well as an alternative signal source 180. The SDA 110, receiver subsystem 130 and platform 150 are not so limited and in modified environments the SDA 110 will be spatially located in other relationships with respect to the receiver subsystem 130, platform 150, non-cooperative object or target 120, cooperative object 122 and the alternative signal source 180.

As indicated schematically in FIG. 1, the SDA 110 defines a first coordinate system 5. The first coordinate system 5 includes an origin 10 where an X-axis 12, a Y-axis 13, and a Z-axis 14 meet. As further indicated schematically in FIG. 1, the X-axis 12 is orthogonal or approximately orthogonal to both of the Y-axis 13 and the Z-axis 14. In addition, the Y-axis 13 is orthogonal or approximately orthogonal to the Z-axis 14. The first coordinate system 5 provides a mechanism to spatially define the relative location and orientation of items in the environment 100. While the origin 10 may be defined at any location within or about the SDA 110, the origin 10 is preferably located at the phase center of the N antenna arrays forming the SDA 110.

In the illustrated embodiment a three-dimensional coordinate space is shown. However, it should be understood that under some circumstances (e.g., operation of a motorized vehicle such as a radio-controlled car, a surface ship, a taxiing aircraft or a car over surfaces where there is little, if any change in one of the orthogonal dimensions) a two-dimensional coordinate space or X-Y plane is still useful for locating or defining a position of a portable device, the surface ship, taxiing aircraft, car or any other signal reflecting item on or near the X-Y plane. The location of non-signal reflective items may be communicated via local information describing an environment 100. As is well known, a position or point on the X-Y plane is identified by two perpendicular lines that intersect each other at the point, which is defined by X-Y coordinates each separately defined by a signed distance from the origin to the respective perpendicular line. Alternatively, each point on a plane can be defined by a polar coordinate system where a point is defined by a distance from a reference point or origin and an angle from a reference direction.

In three dimensions, three perpendicular planes (e.g., a X-Y plane, a Y-Z plane, and a X-Z plane) that intersect each other at an origin are identified and three coordinates of a position or point in the three-dimensional coordinate space are defined by respective signed distances from the point to each of the planes (e.g., point x, y, z). The direction and order for the respective three coordinate axes define a right-hand or a left-hand coordinate system. The first coordinate system 5 is a right-hand coordinate system. Alternative coordinate systems can replace the first coordinate system 5. Such alternatives include a cylindrical coordinate system or a spherical coordinate system.

Wherever located in the environment 100 with respect to the receiver subsystem 130, the platform 150, the non-cooperative object 120, cooperative object 122 and the alternative or optional signal source 180, the SDA 110 generates and controllably transmits N uniquely coded signals 113 where N is a positive integer greater than or equal to two. The SDA or signal generation subsystem 110 includes at least one signal generator 111 and N antenna arrays 112. As indicated in FIG. 1, the N uniquely coded signals 113, generated by and transmitted from the SDA 110, impinge or directly encounter both the non-cooperative object 120 and the platform 150. These non-reflected versions of the N uniquely coded signals 113 are reflected by one or more surfaces of the non-cooperative object or target 120 such that R reflections 114 of the N uniquely coded signals 113 are received by one or more antennas 132 at the first receiver or receiver subsystem 130.

The improved systems and methods for guidance or navigation may be arranged to consider various objects as non-cooperative objects 120 in accordance with an environment of interest. For example, if the system is deployed in a harbor a group of non-cooperative objects 120 may include surface ships and other watercraft, buoys, flotsam, jetsam, etc. By way of further example, when the system is arranged to guide airborne platforms a group of non-cooperative objects 120 may include missiles, projectiles, aircraft, and even spacecraft. In still other examples, a non-cooperative object 120 may include stationary or non-stationary objects supported by land such as, cars, trucks, trains, tanks, fences, buildings, etc. It should be understood that when one or more cooperative objects 122a-122n are present in the environment 100 these cooperative objects 122a-122n may also reflect the N uniquely coded signals 113. Cooperative objects 122 may include any stationary or non-stationary object whether on land, on the surface of a body of water, or airborne that communicates in some way to one of the receiver subsystem, the SDA or the one or more platforms 150.

In the illustrated embodiment, the tracking and/or guidance system 100 includes a receiver subsystem 130 and a platform 150. The SDA 110 may be a fixed station on the ground or a moving station disposed on a moving platform such as, for example, a ship, an airplane, a flying drone, a truck, a tank, or any other type of suitable vehicle (not shown). The SDA 110 includes an array of N antenna elements 112, a signal generator (SG) 111 and other elements (not shown in FIG. 1). The SDA 110 can be collocated with the receiver subsystem 130, or as shown in the illustrated embodiment, is removed from but at a known position in the first coordinate system 5 relative to the origin 10. Together, the SDA 110 and the receiver subsystem 130 determine a position of the target or non-cooperative object 120 in the coordinate system 5. The receiver subsystem 130 is arranged with a radio-frequency communication link to send wireless information signals 140 to the SDA 110. One or more clock signals, synchronization signals or codes may be communicated from the SDA 110 to the receiver subsystem 130 over the radio frequency communication link. Alternatively, the receiver subsystem 130 uses one or more wired connections to send information signals 139 to the SDA 110. In an alternative arrangement, the above described clock signals, synchronization signals or codes are communicated via wired connections from the SDA 110 to the receiver subsystem 130. However arranged, the information signals 139 or the wireless information signals 140 include information responsive to one or more characteristics of the R reflected versions 114 of the N uniquely coded transmit signals 113, where R and N are positive integers and where R is less than or equal to N.

When so desired, the radio-frequency communication link may be arranged to send additional wireless information signals to one or more cooperative objects 122a-122n. These wireless information signals may include local information such as a floor plan, a harbor chart, an airport map, a city map, etc. In addition, the wireless information signals may include transponder configuration parameters. For example, a transponder configuration parameter may include a fixed frequency difference that a particular transponder is directed to apply to the N uniquely coded signals 113 received by the transponder. Each transponder in the environment 100 will be associated with one of the cooperative objects 122a-122n. Otherwise, the transponders associated with the respective cooperative objects 122 may include firmware or stored information that may include local information and a respective modification for the transponder to apply to the received N uniquely coded signals 113 before transmitting modified versions 117 of the N uniquely coded signals. In operation, modified versions 117 of the N uniquely coded signals 113 transmitted from the respective transponders in accordance with a designated modification can be used by one or more platforms 150 to identify the location and motion (if any) of the respective cooperative objects 122 in the coordinate system 5. Example modifications to the uniquely coded signals 113 may include one or more of changes in frequency, time, phase or polarization. A separately identifiable change in any of these parameters or in combinations of these parameters can be used to uniquely identify cooperative objects 122a-122n in the environment 100.

In the example embodiment, the receiver subsystem 130 is arranged with processing circuitry or a processor 131, memory 135, signal generator 138 and one or more antennas 132. The memory 135 includes one or more logic modules and data values (not shown) that when controllably retrieved and executed by the processor 131 enable the processor 131, in response to information derived from the R reflections 114 of the N uniquely coded signals 113 received at the antenna 132, to determine a position of the non-cooperative object 120 in the first coordinate system 5. Changes in the location of the non-cooperative object 120 relative to the SD architecture 110 and/or the receiver subsystem 130 may also be determined by the processor 131. In turn, the processor 131 forwards the location and motion information associated with the non-cooperative object 120 to the signal generator 138 to format, amplify and or buffer the information for communication to the SD architecture 110 via one or both of the communication link 139 and the communication link 140.

One or more of the N antenna arrays 112 or a separate dedicated antenna (not shown) is provided to wirelessly communicate information regarding the location and motion (if any) of the non-cooperative object or target 120 via communication link 115 to the platform 150. The platform 150 uses the location and motion information received from the SDA 110 to track the location of the non-cooperative object 120. In addition, the platform 150 uses both the location and motion information received from the SDA 110 and a self-determined location and motion as inputs to guide or navigate the platform 150 with respect to the non-cooperative object 120. Thus, the platform 150 can be programmed or configured to operate in various modes of operation. For example, when the non-cooperative object 120 is in motion, the platform 150 can be configured to operate in a track mode where movements of the non-cooperative object 120 are recorded by the platform 150. By way of further example, the platform 150 can be configured to track and maintain a specified separation distance from the non-cooperative object or target 120. In another example, when the non-cooperative object 120 is stationary, the platform 150 can be configured to orbit or in some situations avoid the non-cooperative object 120. When so desired, the platform 150 can be operated in an intercept mode that guides or directs one or more control systems of a projectile, missile, ship, airplane, drone, land-based vehicle, portable receiver etc., supporting the platform 150 to intercept the non-cooperative object or target 120. An intercept condition occurs when the platform 150 moves within a desired distance of or contacts the non-cooperative object 120.

The platform 150 uses the location and motion information received from the SDA 110 to track the location of the non-cooperative object 120. Furthermore, the platform 150 uses both the location and motion information received from the SDA 110 and a self-determined location and motion as inputs to guide or navigate the platform 150 with respect to the non-cooperative object 120. Moreover, the platform 150 uses modified versions 117 of the N uniquely coded signals 113 to also locate, identify and determine relative motion (if any) of one or more cooperative objects 122a-122n that might be located in the environment 100. Thus, the platform 150 can be further programmed or configured to avoid and/or track both cooperative objects 122a-122n as well as non-cooperative object 120.

In the example embodiment, the platform 150 is arranged with processing circuitry or a processor 151, memory 155, and one or more antennas 152. Platform 150 may be fixed to one or more of a missile, a projectile, a ship, an airplane, a flying drone, a truck, a tank, or any other type of suitable vehicle or even a relatively small portable device (not shown). When the platform 150 is coupled to or part of a projectile, the platform 150 may be dropped, launched, expelled or otherwise separated from a ship, airplane, drone, or land-based vehicle. The one or more antennas 152 receive the N uniquely coded transmit signals 113 transmitted by the SDA 110. The memory 155 includes one or more logic modules and data values (not shown) that when controllably retrieved and executed by the processor 151 enable the processor 151, in response to information derived from the N uniquely coded signals 113 as received at the antennas 152, to self-determine a position of the platform 150 in the coordinate system 5. Changes in the location of the platform 150 relative to the SDA 110 may also be determined by the processor 151. In addition, one or more of the antennas 152 or a dedicated antenna (not shown) may receive information identifying the location and motion (if any) of the non-cooperative object 120 as communicated by the SDA 110 via the communication link 115. Thus, the one or more logic modules and stored data values can be transferred to the processor 151 to enable any one of the described or other operational modes.

As also illustrated in FIG. 1, an optional or alternative signal source 180 (or a set of such signal sources) may communicate an information signal 185 to the platform 150. The information signal 185 may be received by one or more of the antennas 152 one or more of the optional antennas 154 and or a dedicated antenna (not shown). In an example embodiment, the information signal 185 includes location, motion (if any) and orientation of the non-cooperative object 120 in accordance with a coordinate system other than the coordinate system 5. For example, the information signal 185 may include location as defined by latitude, longitude (in degrees, minutes, seconds format or in decimal format) and altitude in meters with respect to sea level as determined by a global positioning system (GPS) receiver or a signal source responsive to such a system. By way of further example, the platform 150 may be arranged with a GPS receiver (not shown) and the information signals 185 may each include a specific pseudorandom code known to the receiver, a time of transmission and the location of the satellite broadcasting the respective signal. In still other examples, the respective information signal may be sent from an airborne platform arranged with a synthetic aperture array that has identified a structure or other non-cooperative object 120. However configured, when the location of the non-cooperative object 120 is provided to the platform 150 in a coordinate system other than the coordinate system 5 a conversion operation will be necessary for the platform 150 to determine its distance to the non-cooperative object or target 120.

As also illustrated by way of dashed lines, the platform 150 may be accompanied by one or more instances of separate platforms 150a-150n. When so provided, each member of the group of platforms 150a-150n is arranged with one or more positioning antennas 152 and one or more tracking antennas 154. As described, the positioning antennas 152 receive the N uniquely coded signals 113 transmitted from the SDA 110 and the tracking antennas 154 receive reflected versions 114 of the N uniquely coded signals that are reflected by the non-cooperative object 120. When so arranged, at least one of the platforms 150 includes a respective platform processor (not shown) that determines a distance to the non-cooperative object 120. The platform 150 receives information from at least two other members of the remaining platforms 150a-150n. The shared information includes the respective self-determined position, motion and orientation in the coordinate frame 5 and the determined position and motion (if any) of the non-cooperative object 120 in the coordinate frame 5. The platform(s) 150 may be arranged with dedicated transceivers and signal processors (not shown) for communicating with the remaining platforms 150a-150n.

In addition, the platform 150 communicates a self-determined position, motion and orientation and the calculated position of the non-cooperative object 120 in the coordinate frame 5 to other members of the group of platforms. Furthermore, the platform 150 may be arranged to generate a guidance or navigation solution to direct platform 150 with respect to the non-cooperative object 120. Such guidance solutions may include instructions that direct control systems on the platform 150 to follow or intercept a moving non-cooperative object 120, or to orbit or intercept a stationary non-cooperative object 120. In some embodiments, such guidance or navigation solutions may generate control signals that direct the platform along an intended path, route or channel. In these embodiments, the guidance or navigation solutions may be arranged or programmed to avoid various objects in the environment 100. In embodiments where multiple platforms 150a-150n are deployed each platform 150 will separately determine a guidance solution. Moreover, information may be shared with other members of the group of platforms 150a-150n. Such information may assist a platform 150 that is not receiving reflected versions 114 of the uniquely coded signals 113 to continue in a direction or path towards the non-cooperative object or target 120 until such time that whatever was blocking the path of the reflected signals is no longer in the way.

When so arranged, at least one of the platforms 150 includes a respective platform processor (not shown) that determines a distance to the non-cooperative object 120. The platform 150 receives information from at least two other members of the remaining platforms 150a-150n. The shared information includes the respective self-determined position, motion and orientation in the coordinate frame 5 and the determined position and motion (if any) of the non-cooperative object 120 in the coordinate frame 5. The platform(s) 150 may be arranged with dedicated transceivers and signal processors (not shown) for communicating with the remaining platforms 150a-150n.

As further illustrated by way of dashed lines, the environment 100 may include one or more cooperative objects 122a-122n. When so provided, one or more platforms 150a-150n arranged with one or more positioning antennas 152 and one or more tracking antennas 154 will receive the N uniquely coded signals 113 transmitted from the SDA 110, the reflected versions 114 of the N uniquely coded signals that are reflected from a non-cooperative object 120 and modified versions 117 of the N uniquely coded signals 113 that are received, modified and transmitted from the one or more cooperative objects 122a-122n. Both the positioning antennas 152 and the tracking antennas 154 may receive the N uniquely coded signals 113 transmitted from the SDA 110, the reflected versions 114 of the N uniquely coded signals and the modified versions 117 of the N uniquely coded signals 113 transmitted from the one or more cooperative objects 122a-122n. It should be understood that for some arrangements of the platform positioning antennas 152 and platform tracking antennas 154 and respective signal processing circuits there may be situations where a frequency shift used by a transponder in a cooperative object 122 is large enough that the processing circuits coupled to the tracking antennas 154 may tune to a frequency band that is outside of the detectible range of the positioning antennas and the respective processing circuits. In these arrangements, the tracking antennas 154 and respective processing circuits will receive and process the modified versions 117 of the N uniquely coded signals 113, while the positioning antennas 152 and respective processing circuits will receive and process the N uniquely coded signals 113 sent from the SDA 110.

Figure 2A:
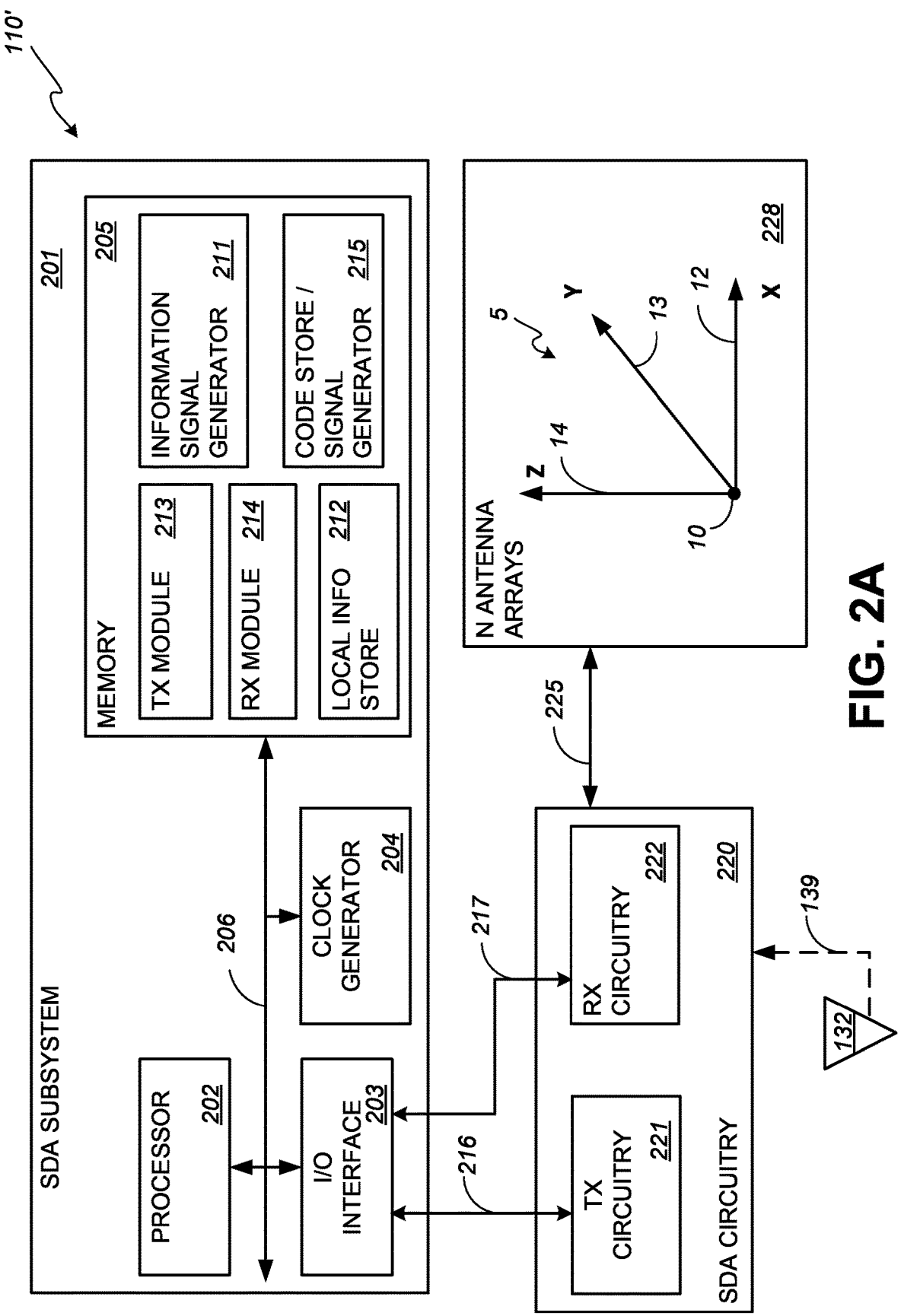
FIG. 2A is a schematic diagram of an example embodiment of the spatially distributed architecture (SDA) introduced in the sensor system of FIG. 1.

FIG. 2A illustrates an example embodiment of the SDA 110 introduced in FIG. 1. In the illustrated embodiment, the SDA 110' includes a SDA subsystem 201, SDA circuitry 220 and N antenna arrays 228. As indicated, the N antenna arrays 228 define the coordinate system 5 introduced in FIG. 1. The SDA subsystem 201 includes a processor 202, input/output (I/O) interface 203, clock generator 204 and memory 205 coupled to one another via a bus or local interface 206. The bus or local interface 206 can be, for example but not limited to, one or more wired or wireless connections, as is known in the art. The bus or local interface 206 may have additional elements, which are omitted for simplicity, such as controllers, buffers (caches), drivers, repeaters, and receivers (e.g. circuit elements), to enable communications. In addition, the bus or local interface 206 may include address, control, power and/or data connections to enable appropriate communications among the aforementioned components.

The processor 202 executes software (i.e., programs or sets of executable instructions), particularly the instructions in the information signal generator 211, TX module 213, RX module 214, and code store/signal generator 215 stored in the memory 205. The processor 202 in accordance with one or more of the mentioned generators or modules may retrieve and buffer data from the local information store 212. The processor 202 can be any custom made or commercially available processor, a central processing unit (CPU), an auxiliary processor among several processors associated with the SDA subsystem 201, a semiconductor based microprocessor (in the form of a microchip or chip set), and application specific integrated circuit (ASIC) or generally any device for executing instructions.

The clock generator 204 provides one or more periodic signals to coordinate data transfers along bus or local interface 206. The clock generator 204 also provides one or more periodic signals that are communicated via the I/O interface 203 over connection 216 to the TX circuitry 221. In addition, the clock generator 204 also provides one or more periodic signals that are communicated via the I/O interface 203 over connection 217 to the RX circuitry 222. The one or more periodic signals forwarded to the SDA circuitry 220 enable the SDA 110' to coordinate the transmission of the N uniquely coded signals 113 to the N antenna arrays 228 via the connections 225 and the reception of informative signals from the receiver subsystem 130 via the N antenna arrays 228 or the optional connection 139. The I/O interface 203 includes controllers, buffers (caches), drivers, repeaters, and receivers (e.g. circuit elements), to enable communications between the SDA subsystem 201 and the SDA circuitry 220.

The memory 205 can include any one or combination of volatile memory elements (e.g., random-access memory (RAM), such as dynamic random-access memory (DRAM), static random-access memory (SRAM), synchronous dynamic random-access memory (SDRAM), etc.) and nonvolatile memory elements (e.g., read-only memory (ROM)). Moreover, the memory 205 may incorporate electronic, magnetic, optical, and/or other types of storage media. Note that the memory 205 can have a distributed architecture, where various components are situated remote from one another, but can be accessed by the processor 202.

The information signal generator 211 includes executable instructions and data that when buffered and executed by the processor 202 generate and forward a signal or signals that communicate at least P electrical measurements made by the first receiver in response to the reflections 114 of the N uniquely coded signals 113 transmitted by the N transmit arrays 228, where P is a positive integer. Alternatively, the information signal generator 211 includes executable instructions and data that when buffered and executed by the processor 202 generate and forward a signal or signals that communicate a position and motion (if any) of the non-cooperative object 120 in the coordinate system 5.

The code store/signal generator 215 includes executable instructions and data that when buffered and executed by the processor 202 generate and forward a set of N signals that are encoded or arranged in a manner that enable a receiver of the N signals, such as, the receiver subsystem 130, the platform 150, or both to separately identify each of the N signals at location separate from the SDA 110'. The TX module 213 includes executable instructions and data that when buffered and executed by the processor 202 enable the SDA subsystem 201 to communicate a set of uniquely identifiable signals to a spatially distributed architecture (SDA) of N antenna arrays 228, where N is a positive integer greater than or equal to two, the arrangement of the N antenna arrays defining the coordinate system 5. The TX module 213 includes executable instructions and data that when buffered and executed by the processor 202 enable the SDA subsystem 201 to receive reflected versions 114 of the set of uniquely identifiable signals 113 transmitted from the SDA of N antenna arrays 212 and reflected by the non-cooperative object 120 and determine a location of the non-cooperative object 120 in the first coordinate system 5 based on a respective time and phase of reflected versions of the uniquely identified signals and an angular position and a range of the receiver subsystem 130 relative to an origin of the first coordinate system 5.

In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

FIG. 2B illustrates an alternative embodiment of the SDA circuitry 220' introduced in FIG. 2A. In the illustrated embodiment, the receiver subsystem 130 is in close proximity to the transmit circuitry 221'. The receiver subsystem 130 includes antenna 132 and receive circuitry 222. The antenna 132 converts electromagnetic energy in the R reflections of the N unique coded signals 114 that arrive at the antenna 132 to electrical signals. The electrical signals are forwarded to the receive circuitry 222 where they are filtered and amplified. The transmit circuitry 221' includes a master oscillator (MO) 223, a synchronization clock (SYNC CLK) 224, a set of transmit signal generators 226a-226n and a respective set of antennas 228a-228n. The master oscillator 223 generates a common carrier frequency that is distributed to each of the transmit signal generators 226a-226n and to the synchronization clock 224. The synchronization clock 224 adjusts the common carrier frequency and forwards respective codes to each of the respective transmit signal generators 226a-226n. The synchronization clock 224 may divide the common carrier frequency by a factor before forwarding the codes. In turn, the transmit signal generators 226a-226n modulate the common carrier frequency with the respective codes and convert the common carrier frequency to a radio frequency. An output of each of the transmit signal generators 226a-226n is coupled to an input of a respective antenna 228a-228n. The antennas 228 receive the electrical signals produced by the transmit signal generators 226a-226n and convert the coded electrical signals to an over-the-air electromagnetic wave.

Although the illustrated embodiment shows the transmit signal generators 226a-226n and antennas 228a-228n in a one-to-one relationship, two or more of the transmit signal generators 226a-226n may share an antenna. Preferably, the transmit signal generators 226a-226n are augmented by a digital signal processor (not shown) that spatially directs the set of N uniquely coded transmit signals 113 in the environment 100. Such directivity or beamforming techniques controllably direct the radio-frequency electromagnetic energy in a predictable way. Accordingly, a control system (not shown) or other source of information identifying a region of interest in the environment 100 may direct the SDA circuitry 220' to send the set of N uniquely coded transmit signals 113 in the general direction of a target or non-cooperative object 120. Similarly, the control system or other source of information identifying a region in the environment 100 where a platform 150 is expected to be located may direct the SDA circuitry 220' to send the set of N uniquely coded transmit signals 113 in the general direction of the platform 150.

The set of N uniquely coded signals 113 produced by the transmit signal generators 226a-226n are preferably orthogonal, or nearly orthogonal, to each other. This orthogonal coding enables the individual signals to be distinguished from one another at the receiver subsystem 130. There are common signal coding and signal processing techniques that are suitable for this purpose, including, for example, time-division multiplexing, frequency-division multiplexing, code-division multiplexing, and polarization coding. For some environments a combination of one or more of these coding and signal processing techniques can be used to generate a set of signals that do not interfere with one another and are thus separately identifiable.

The antennas 228a-228n are spatially distributed in such a way that a small positional difference of the non-cooperative object or target 120 being tracked produces a relatively large differential path length between the R reflections of the N uniquely coded signals 114 that encounter the antenna 132. Several example scenarios for spatial distributions of the antennas 228a-228n are described below in more detail. In addition, the antennas 228a-228n are spatially distributed in such a way that a small positional difference between an array of antennas 152 arranged on an platform 150 produces a relatively large differential path length between the N uniquely coded signals 113 that encounter the antennas 152.

Figure 3A:
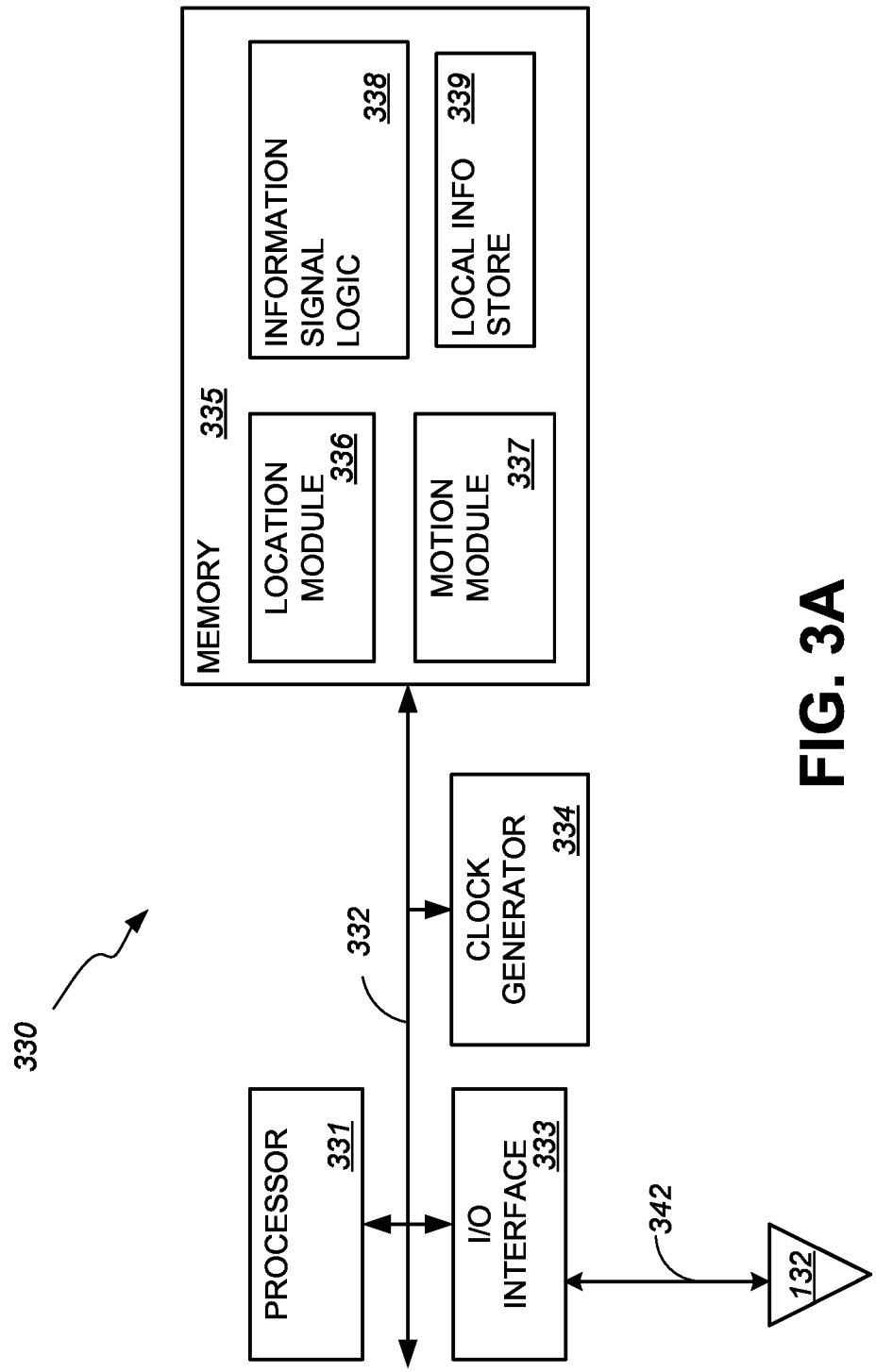
FIG. 3A is a schematic diagram of an example embodiment of the first receiver of FIG. 1.

FIG. 3A illustrates an example embodiment of the receiver subsystem 130 introduced in FIG. 1. In the illustrated embodiment, the receiver subsystem 330 includes a processor 331, I/O interface 333, clock generator 334 and memory 335 coupled to one another via a bus or local interface 332. The bus or local interface 332 can be, for example but not limited to, one or more wired or wireless connections, as is known in the art. The bus or local interface 332 may have additional elements, which are omitted for simplicity, such as controllers, buffers (caches), drivers, repeaters, and receivers (e.g. circuit elements), to enable communications. In addition, the bus or local interface 332 may include address, control, power and/or data connections to enable appropriate communications among the aforementioned components.

The processor 331 executes software (i.e., programs or sets of executable instructions), particularly the instructions in the location module 336, motion module 337 and information signal logic 338 stored in the memory 335. The processor 331 in accordance with one or more of the mentioned modules or logic may retrieve and buffer data from the local information store 339. The processor 331 can be any custom made or commercially available processor, a CPU, an auxiliary processor among several processors associated receiver subsystem 330, a semiconductor based microprocessor (in the form of a microchip or chip set), an ASIC or generally any device for executing instructions.

The clock generator 334 provides one or more periodic signals to coordinate data transfers along bus or local interface 332. The clock generator 334 also provides one or more periodic signals that are communicated via the I/O interface 333 over connection 342 to communicate wirelessly via antenna(s) 132 or connection 139 when the receiver subsystem 330 is proximal to the SDA 110'. In addition, the clock generator 334 also provides one or more periodic signals that enable the receiver subsystem 330 to coordinate the transmission of informative signals. The I/O interface 333 includes controllers, buffers (caches), drivers, repeaters, and receivers (e.g. circuit elements), to enable communications between the receiver subsystem 330 and the SDA subsystem 201.

The memory 335 can include any one or combination of volatile memory elements (e.g., RAM, DRAM, SRAM, SDRAM, etc.) and non-volatile memory elements (e.g., ROM). Moreover, the memory 335 may incorporate electronic, magnetic, optical, and/or other types of storage media. Note that the memory 335 can have a distributed architecture, where various components are situated remote from one another, but can be accessed by the processor 331.

The location module 336 includes executable instructions and data that when buffered and executed by the processor 331 generate and forward information to information signal logic 338 such as at least P electrical measurements made by the first receiver subsystem 330 in response to the reflections 114 of the N uniquely coded signals 113 transmitted by the N transmit arrays 228, where P is a positive integer. Alternatively, the location module 336 may be arranged to forward a location in X, Y, Z coordinates relative to the origin 10 of the coordinate system 5.

Motion module 337 includes executable instructions and data that when buffered and executed by the processor 331 determine and forward motion information to information signal logic 338 such motion information may include velocity vector values in X, Y, Z coordinates relative to the origin 10 of the coordinate system 5.

Information signal logic 338 includes executable instructions and data that when buffered and executed by the processor 331 generate and forward a signal or signals that communicate a position and motion (if any) of the non-cooperative object 120 in the coordinate system 5. In some embodiments, the information signal logic 338 may generate signals that provide local information to one or more cooperative objects 122a-122n. The information signal logic 338 may also generate signals that include one or more configuration parameters intended to be communicated to respective cooperative objects 122a-122n.

As indicated, local information store 339 may include data describing a local map, chart, floorplan, etc. The local information store 339 may include locations of fixed items in the coordinate system 5 defined by the SDA 110. The included data may also define one or more preferred paths, routes, or channels for the platform 150 to use. This included data may be communicated directly or indirectly from the receiver subsystem 330 to the platform(s) 150 as may be desired. In addition, the data in local information store 339 may receive updates or real-time information regarding the environment 100. Such real-time updates may include the position of both fixed structures and moving platforms 150a-150n in the local environment 100. In some arrangements, the local information store 339 may also receive information including the position and motion (if any) of one or more cooperative objects 122a-122n present in the environment 100.

Figure 3B:
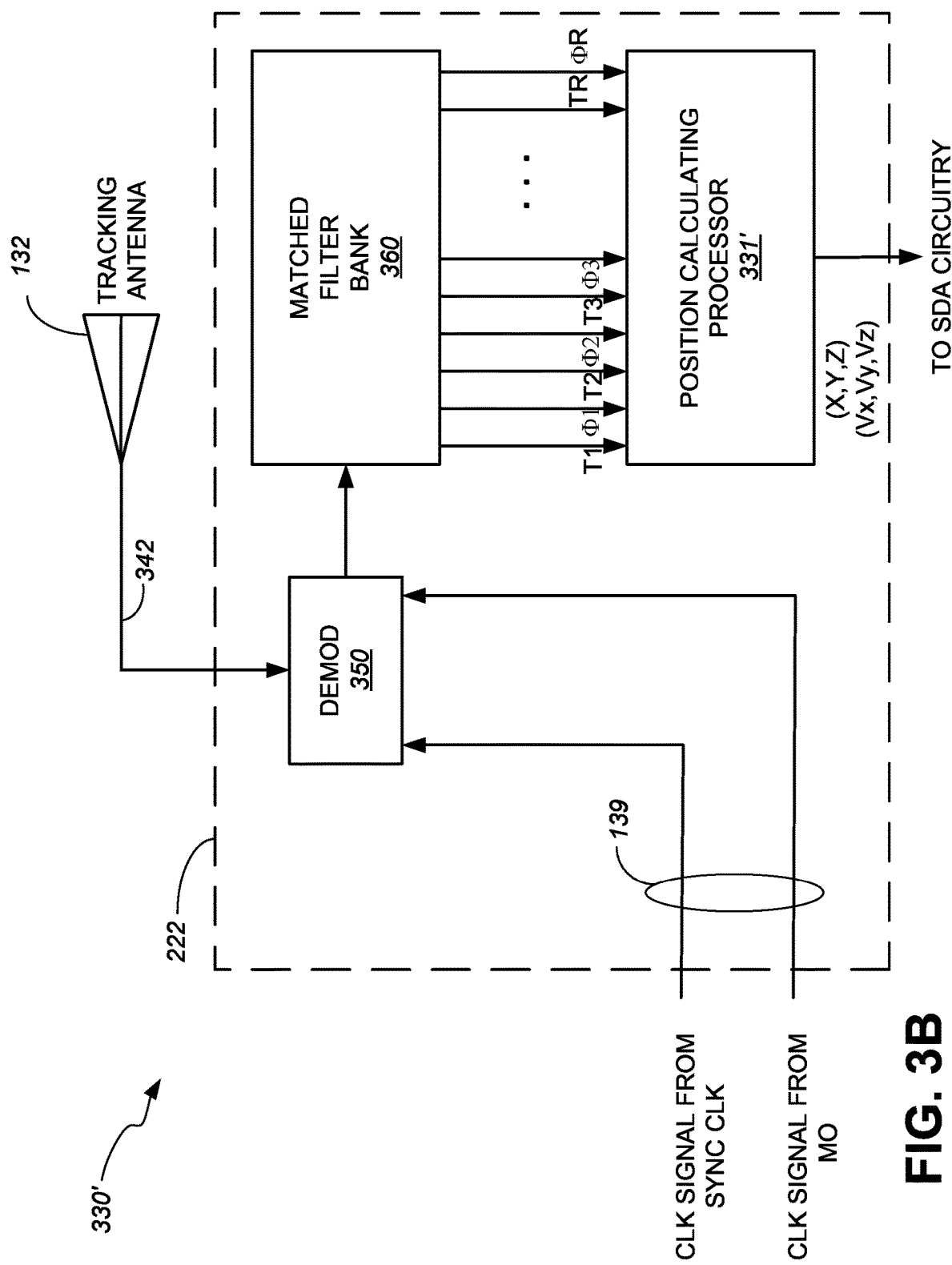
FIG. 3B is a schematic diagram of an alternative embodiment of the first receiver of FIG. 1.

FIG. 3B illustrates a functional block diagram of an embodiment of a receiver subsystem 330'. The receiver subsystem 330' includes receiver circuitry 222 and one or more tracking antennas 132. The receiver circuitry 222 is configured to operate in conjunction with the transmit circuitry 221, 221' shown in FIG. 1 and FIG. 2B. In the illustrated arrangement, the receiver circuitry 222 includes a demodulator (DEMOD) 350, matched filter bank 360 and a position calculating processor 331'. The demodulator 350 receives respective signals from the synchronization clock 224 (FIG. 2B) and the master oscillator 223 (FIG. 2B) as well as electrical signals from the tracking antennas 132 on connection 342. The tracking antenna(s) 132 receives electromagnetic energy transmitted by the transmit circuitry 221 (FIG. 2A) and reflected off of the non-cooperative object or target 120 being tracked. The tracking antenna 132 may be a single antenna or an array of antennas. For ease of discussion, it will be assumed that the tracking antenna 132 is a single antenna. The demodulator 350 receives the carrier frequency from the master oscillator 223 and the synchronization clock 224 from the SDA circuitry 220', which enable the demodulator 350 to demodulate and decode the R reflections of the N uniquely coded signals 114. A matched filter bank 360 of the receiver circuitry 222 receives the demodulated signal from the demodulator 350 and filters the signal to separate the reflections of the N uniquely coded signals 114 from one another and determine the time, T, and phase, $\phi$, of each respective signal. As further indicated in FIG. 3B, separate time, T(r), and phase, $\phi$(r) signals are forwarded to the position calculating processor 331', which determines present X, Y, Z coordinate values in the coordinate system 5. In this way, the position calculating processor 331' determines a present position of the non-cooperative object 120. In addition, the position calculating processor 331' uses separate instances of present X, Y, Z coordinate values separated by a known time to determine a change in position of the non-cooperative object 120 over the known time. The position calculating processor 331' divides the respective changes in position in each of the three coordinate directions to determine a velocity of the non-cooperating object 120 in each of the X, Y, and Z directions of the coordinate system 5. In addition, the position calculating processor 331' can apply similar logic to determine a present position and motion (if any) of a cooperative object 122.

Figure 4A:
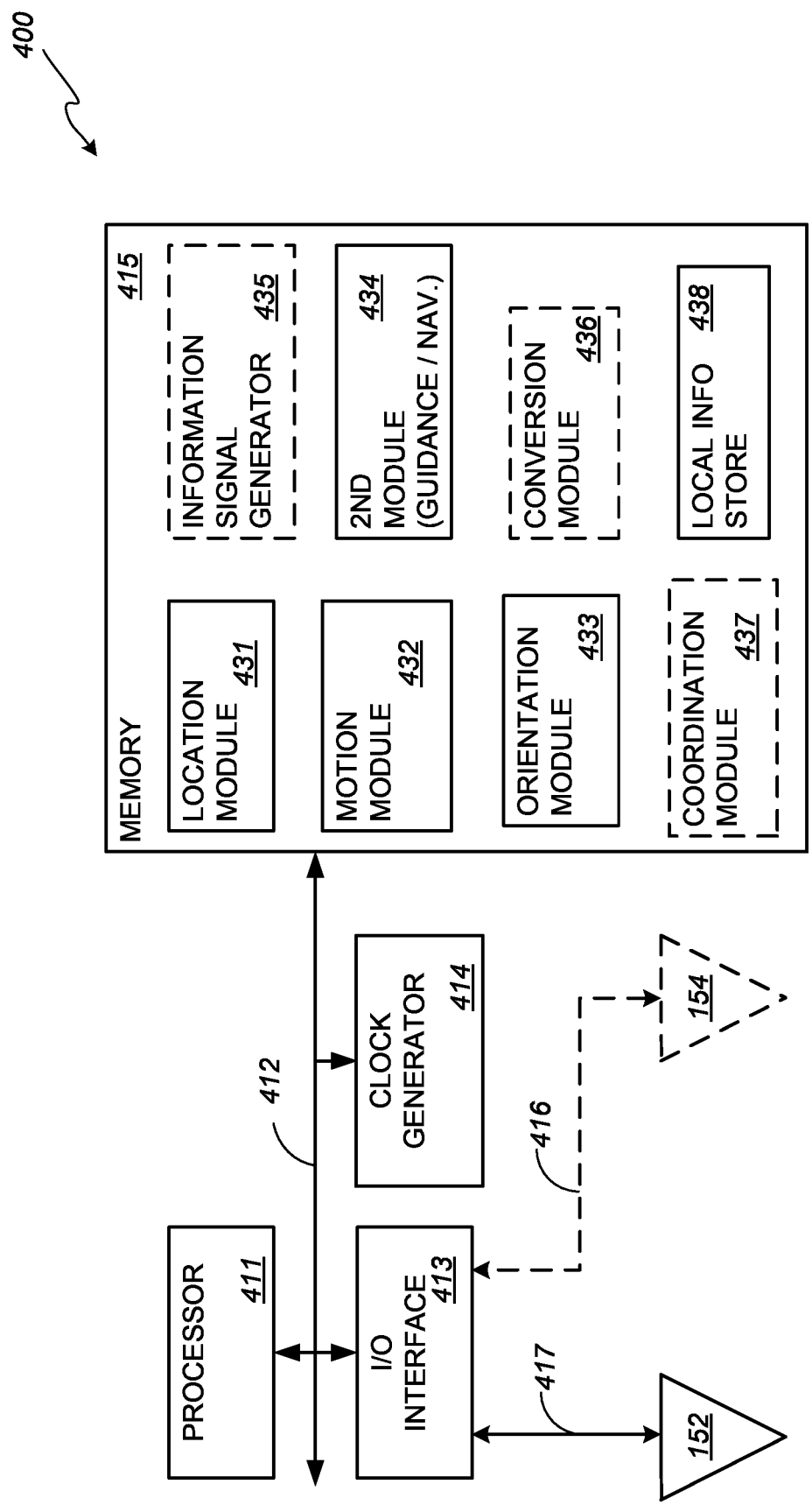
FIG. 4A is a schematic diagram of an example embodiment of a platform introduced in FIG. 1.

FIG. 4A illustrates a functional block diagram of an embodiment of a platform 400. In the illustrated embodiment, the platform 400 includes a processor 411, I/O interface 413, clock generator 414 and memory 415 coupled to one another via a bus or local interface 412. The bus or local interface 412 can be, for example but not limited to, one or more wired or wireless connections, as is known in the art. The bus or local interface 412 may have additional elements, which are omitted for simplicity, such as controllers, buffers (caches), drivers, repeaters, and receivers (e.g. circuit elements), to enable communications. In addition, the bus or local interface 412 may include address, control, power and/or data connections to enable appropriate communications among the aforementioned components.

The processor 411 executes software (i.e., programs or sets of executable instructions), particularly the instructions in the location module 431, motion module 432, orientation module 433 and guidance module 434 stored in the memory 415. The processor 411 can be any custom made or commercially available processor, a CPU, an auxiliary processor among several processors associated with the platform 400, a semiconductor based microprocessor (in the form of a microchip or chip set), an ASIC or generally any device for executing instructions.

The clock generator 414 provides one or more periodic signals to coordinate data transfers along bus or local interface 412. The clock generator 414 also provides one or more periodic signals that are communicated via the I/O interface 413 over connection 417 to communicate wirelessly via antenna(s) 152 or over connection 416 via optional antenna 154. In addition, the clock generator 414 also provides one or more periodic signals that enable the platform 400 to coordinate the transmission of informative signals. The I/O interface 413 includes controllers, buffers (caches), drivers, repeaters, and receivers (e.g. circuit elements), to enable communications between the platform 150 and optional platforms 150a-150n.

The memory 415 can include any one or combination of volatile memory elements (e.g., RAM, DRAM, SRAM, SDRAM, etc.) and non-volatile memory elements (e.g., ROM). Moreover, the memory 415 may incorporate electronic, magnetic, optical, and/or other types of storage media. Note that the memory 415 can have a distributed architecture, where various components are situated remote from one another, but can be accessed by the processor 411.

The location module 431 includes executable instructions and data that when buffered and executed by the processor 411 generate and forward information to information signal generator 435 such as an platform location in X, Y, Z coordinates relative to the origin 10 of the coordinate system 5. The motion module 432 includes executable instructions and data that when buffered and executed by the processor 411 determine and forward motion information to information signal generator 435. Such motion information may include velocity vector values in X, Y, Z coordinates responsive to motion of the platform 400 relative to the origin 10 of the coordinate system 5. The orientation module 433 includes executable instructions and data that when buffered and executed by the processor 411 determine and forward orientation information to information signal generator 435. Such orientation information may include a roll angle and an orientation vector in X, Y, Z coordinates responsive to a present condition of the platform 400 relative to the origin 10 of the coordinate system 5. When such orientation information is recorded and observed over time a roll rate over a select period of time may be determined.

Generally, a roll axis or longitudinal axis passes through a missile, projectile or aircraft from a respective nose to a respective tail. An angular displacement about this axis is called bank. A pilot of a winged aircraft changes the bank angle by increasing lift on one wing and decreasing it on the other. The ailerons are the primary control surfaces that effect bank. For fixed wing aircraft, the aircraft's rudder also has a secondary effect on bank. A missile will use other control surfaces to achieve a desired bank angle, while a projectile may be launched with an intentional roll rate that rotates or spins the projectile about its longitudinal axis.

The term pitch is used to describe motion of a ship, aircraft, or vehicle about a horizontal axis perpendicular to the direction of motion. A pitch axis passes through the aircraft from wingtip to wingtip. Pitch moves the aircraft's nose up or down relative to the pitch axis. An aircraft's elevator is the primary control surface that effects pitch. Yaw is a term used to describe a twisting or oscillation of a moving ship or aircraft around a vertical axis. A vertical yaw axis is defined to be perpendicular to the wings and to the normal line or path of flight with its origin at the center of gravity and directed towards the bottom of the aircraft. Relative movement about the yaw axis moves the nose of the aircraft from side to side. An aircraft's rudder is a control surface that primarily effects yaw.

A roll rate and an orientation of the platform 150 can be determined from a comparison of the polarization of signals transmitted from the antennas 228a-228n with respect to a gravity (or up-down vector) that may align with the Z direction of the coordinate system 5. By aligning the polarization of the transmitted signals with the polarization of the antennas 152a-152n the orientation of the up-down vector can be tracked in time to provide the pitch, roll, and yaw orientation of the platform 150 as a function of time in the coordinate frame 5. In addition, a similar alignment of the polarization of the transmitted signals with the polarization of the optional antenna(s) 154 the orientation of the up-down vector can be tracked in time to provide additional information concerning the pitch, roll and yaw orientation of the platform 150 as a function of time. For missiles and projectiles the antennas 152a-152n may be rearward facing whereas optional antenna(s) 154 may be forward facing. For these form factors, orientation information in the form of pitch and yaw information may be determined from signals received at both the antennas 152a-152n and the antenna(s) 154, while roll orientation information may be determined solely from the antennas 152a-152n.

Alternatively for these form factors, platform orientation including each of pitch, yaw and roll may be determined from the signals received by the antennas 152a-152n alone, from the signals received by the antenna(s) 154 alone, or platform orientation including pitch, yaw and roll may be determined from signals received by the antennas 152a-152n and the antenna(s) 154.

This orientation information is sent to the guidance/navigation module 434 which includes executable instructions and data that when buffered and executed by the processor 411 generate and forward information or control signals to one or more control systems (not shown) of the platform 400. Such control systems may be arranged to navigate or otherwise direct operation of the platform 400 in accordance with information from various sensors in combination with information in local information store 438. As described, the position and motion (if any) of the non-cooperative object 120 in the coordinate system 5 are communicated to the platform 400. In environments that include cooperative objects 122a-122n with suitably arranged transponders, the platform 400 may also receive the position and motion (if any) of the cooperative objects 122a-122n. As described, cooperative objects 122a-122n may be uniquely identified using a transponder that is arranged or directed to apply a separately identifiable modification to the uniquely coded signals 113. For example a time modification could change the time of retransmit to identify the cooperative object. To identify a select cooperative object 122, the modified signal can be transmitted using a time code (staggered pulses that represent a unique time sequence). By way of further example, the phase structure can also be modified by multiplying a sequence of SDA waveforms by a sequence of phase rotations that uniquely identify the object. The position and motion of the cooperative objects 122a-122n may be communicated to the platform 400 via the receiver subsystem 130 and the SDA 110. In addition, the position, motion and orientation of the platform 400 are self-determined in the coordinate system 5. The position and motion (if any) of the platform 400 in conjunction with data in the local information store 438 (including location and motion (if any) of the non-cooperative object 120 and cooperative objects 122a-122n) are forwarded to the guidance/navigation module 434. Thus, a coordinate conversion is not necessarily required on the platform 150. One or more control signals generated by the guidance/navigation module 434 controllably direct the platform 400 with respect to the non-cooperative object 120 and the one or more cooperative objects 122 (when present) in light of the local information describing conditions in the environment 100.

However, in some embodiments the platform 400 may be arranged to receive information concerning the non-cooperative object 120 from an alternate signal source that will typically be in a coordinate frame that is different from that defined by the coordinate system 5. For example, the alternate signal source 180 may provide a location and motion (if any) of the non-cooperative object 120 in a GPS format. When this is the case, an optional conversion module 436 may be arranged with executable instructions and data that when buffered and executed by the processor 411 perform a coordinate conversion to translate a GPS data format to the coordinate system 5. Alternatively, the conversion module 436 may be capable of translating information identifying the location, motion and orientation of the platform 400 in the coordinate system 5 to the GPS data format received from the alternate signal source 180. Upon conversion, the converted information may be communicated to the guidance module 434 and or forwarded to one or more control systems provided on the platform 150.

As further explained in association with an optional embodiment illustrated in FIG. 1, the platform 150 may be a member of a group of similarly configured platforms 150a-150n. When this is the case, the platform 400 may be arranged with an optional coordination module 437 that includes executable instructions and data that when buffered and executed by the processor 411 receives information from at least two other members of the remaining platforms 150a-150n. The shared information includes the respective self-determined position, motion and orientation in the coordinate frame 5 and the determined position and motion (if any) of the non-cooperative object 120 in the coordinate frame 5. The coordination module 437 may further enable the platform 400 to communicate a self-determined position, motion and orientation and the calculated position of the non-cooperative object 120 in the coordinate frame 5 to other members of the group of platforms. Furthermore, the platform 400 may be arranged to generate a guidance solution for one or more of the other members of the group of platforms 150a-150n.

Figure 4B:
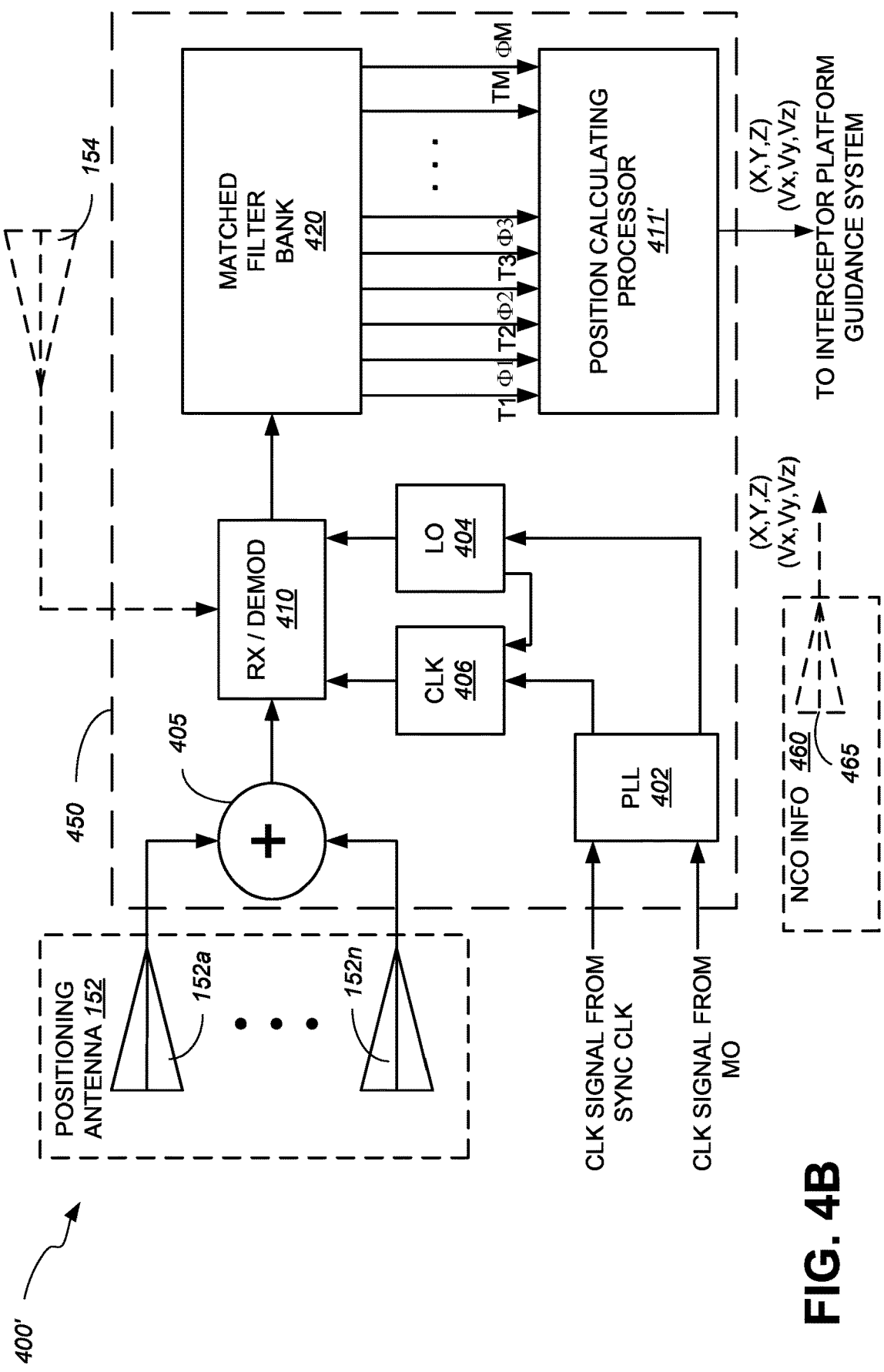
FIG. 4B is a schematic diagram of an alternative embodiment of the platform of FIG. 1.

FIG. 4B illustrates a functional block diagram of an embodiment of a platform 400'. The platform 400' includes platform circuitry 450, one or more positioning antennas 152a-152n and one or more optional antennas 154. The platform circuitry 450 is configured to operate in conjunction with signals from the transmit circuitry 221, 221' shown in FIG. 1 and FIG. 2B. In the illustrated arrangement, the platform circuitry 450 includes a summing node 405, receiver demodulator (RX/DEMOD) 410, matched filter bank 420 and a position calculating processor 411'. The platform circuitry 450 further includes a phase-locked loop (PLL) 402, local oscillator (LO) 404, and a local clock 406. The LO 404 provides a clock signal to the receiver demodulator 410 that is at the same frequency as the MO 223 of the SDA circuitry 220, which enables the receiver demodulator 410 to locate the set of uniquely coded signals 113 transmitted from the SDA 110. The local clock 406 is used by the receiver demodulator 410 to demodulate the set of uniquely coded signals 113. The LO 404 and the local clock 406 preferably are synchronized to the MO 223 and the synchronization clock 224, respectively, just before or shortly after launch of a missile, or deployment of the platform 150 by using the PLL 402 in the platform circuitry 450 to phase align the clock signal generated by LO 404 with the clock signal generated by MO 223. The positioning antenna(s) 152a-152n receive electromagnetic energy directly transmitted by the transmit circuitry 221 (FIG. 2A). The positioning antenna 152 may be a single antenna or an array of antennas. However arranged, the summing node 405 receives the separate electrical signals provided by the positioning antenna 152 and forwards a composite signal to the receiver demodulator 410. The receiver demodulator 410 receives the carrier frequency from the local oscillator 404 and the synchronization clock signal from the local clock 406, which enable the receiver demodulator 410 to demodulate and decode the N uniquely coded signals 113. A matched filter bank 420 receives the demodulated signals from the receiver demodulator 410 and filters the signals to separate the N uniquely coded signals 113 from one another and determines the time, T, and phase, $\phi$, of each respective signal. As further indicated in FIG. 4B, separate time, T(r), and phase, $\phi(r)$ signals are forwarded to the position calculating processor 411', which determines present X, Y, Z coordinate values in the coordinate system 5. In this way, the position calculating processor 411' determines a present position of the platform 150. In addition, the position calculating processor 411' uses separate instances of present X, Y, Z coordinate values separated by a known time to determine a change in position of the platform 150 over the known time. The position calculating processor 411' divides the respective changes in position in each of the three coordinate directions to determine a velocity of the platform 150 in each of the X, Y, and Z directions of the coordinate system 5.

As indicated in the illustrated embodiment, the platform 400' may be arranged with a receiver 460 for receiving over-the-air information signals. The over-the-air information signals may include information signal 115 generated and transmitted from the SDA 110 or information signal 185 generated and transmitted from an alternate signal source 180. The electromagnetic waves in the over-the-air information signals are converted to electrical signals by the antenna 465. The electrical signals may be filtered, demodulated and amplified to convey location and motion information responsive to the non-cooperative object 120. Furthermore, the electrical signals converted by the antenna 465 may be buffered over time at the receiver 460 to determine changes in each of the X, Y, and Z coordinates over a specified time. When the over-the-air signals are generated and transmitted from the SDA 110, the location and velocity of the non-cooperative object 120 are identified using X, Y, Z coordinates in the coordinate system 5. When the over-the-air signals are transmitted from an alternative signal source 180, the location and velocity of the non-cooperative object 120 may be provided in an alternate coordinate system different from the coordinate system 5. For example, the location of the non-cooperative object 120 may be provided in GPS coordinates or other three-dimensional coordinate systems. When the location of the non-cooperative object 120 is provided in a coordinate system that is different from the coordinate system 5, the platform processor 151 or some other processor will perform a coordinate transformation. Preferably, the platform processor 151 will convert or transform the location of the non-cooperative object 120 to the coordinate system 5.

As further indicated in the illustrated embodiment, the platform 400' may optionally be arranged with one or more tracking antennas 154. When so provided, the one or more tracking antennas 154 receive M reflected versions 114 of the N uniquely coded signals 113, where M is an integer less than or equal to N. For ease of discussion, the tracking antenna 154 is a single antenna. The electrical signal(s) received by the tracking antenna(s) 154 are forwarded to the receiver demodulator 410. The receiver demodulator 410 demodulates the reflected versions of the N uniquely coded signals. The demodulated signals are forwarded to the matched filter bank 420, which separates the reflected versions 114 of the N uniquely coded signals 113 from each other. The electrical signals representative of the over-the-air signals transmitted directly from the SDA 110 to the platform 150 traverse a first set of paths. Whereas, the electrical signals representative of the reflected versions of the over-the-air signals as received at the tracking antennas 154 have traversed from the SDA 110 to the non-cooperative object 120 and from there to the platform 150. Consequently, the time and phase of each of these reflected signals will not be the same as the time and phase of the signals received at the positioning antennas 152. When provided both sets of signals, the position calculating processor 411' determines a platform position and a non-cooperative object position in the coordinate system 5. In addition, when provided both sets of signals over time, the position calculating processor 411' uses separate instances of present X, Y, Z coordinate values separated by a known time to determine a change in position of the platform 150 over the known time and to determine a change in position of the non-cooperative object 120 over the known time. The position calculating processor 411' divides the respective changes in position of each of the platform 150 and the non-cooperative object 120 in each of the three coordinate directions to determine a respective velocity of the platform 150 and the non-cooperative object 120 in each of the X, Y, and Z directions of the coordinate system 5. In addition, the position calculating processor 411' can apply similar logic to determine a present position and motion (if any) of a cooperative object 122.

For example, let $s_1(t-t_0)$ and $s_2(t-t_0)$ denote two signals transmitted from transmitters A and B respectively where $t_0$ is the time of transmit. Assume that signal $s_1$ is received at the first receiver at absolute time $t_1$ and the signal $s_2$ is received at the second receiver at absolute time $t_2$. Assuming, a common frequency, an amplitude propagation model for these signals is defined by equation 1 and equation 2.

$$s_1(t-t_0) = e^{2\pi j f(t_1-t_0)} \text{ and } s_2(t-t_0) = e^{2\pi j f(t_2-t_0)} \quad \text{Equations 1 and 2}$$

The phase of the signals is defined by equations 3 and 4.

$$\varphi_1 = 2\pi f(t_1 - t_0) \text{ and } \varphi_2 = 2\pi f(t_2 - t_0) \quad \text{Equations 3 and 4}$$

The differential time, $t_d$, is related to the differential phase, as shown in equation 5.

$$t_d = t_1 - t_2 = \frac{1}{2\pi f}(\varphi_1 - \varphi_2) = \frac{\varphi_d}{2\pi f} \quad \text{Equation 5}$$

Thus, the time difference and phase difference are linearly related. Therefore, the terms time difference and phase difference refer to equivalent measured quantities up to a multiplier and resolving any ambiguities in phase.

A position calculating processor 131 of the receiver subsystem 130 performs a position-calculating algorithm, which calculates the X, Y and Z Cartesian (or polar) coordinates of the non-cooperative object 120 and the velocity of the non-cooperative object in the X, Y and Z Cartesian (or polar) directions in coordinate system 5 determined by the location of the antenna arrays 112 in the SDA architecture 110. The manner in which these calculations are made is described below with reference to FIGS. 5-9. The position and velocity information output by the processor 131 is then sent to the SDA 110 via connection 139 or wireless communication link 140. In turn, the SDA 110 transmits or communicates the position and motion of the non-cooperative object 120 to the platform 150 where a guidance solution is computed using the interceptor position and motion computed on the platform.

The use of multiple fixed polarized positioning antennas 152a-152n or a single rotating polarized positioning antenna 152 at the platform 150 enable the roll rate and orientation of the platform 150 with respect to a gravity vector to be determined. The polarization of the signals transmitted by the antennas 228a-228n can be arranged to align with a known up-down vector (gravity) at the location of the SDA 110. By aligning the polarization of the transmitted signals with the polarization of the antennas 152a-152n the orientation of the up-down vector can be tracked in time to provide the pitch, roll, and yaw orientation of the platform 150 as a function of time in the coordinate frame 5 determined by the location of the antennas 228a-228n of the SDA 110. This orientation information is sent to the guidance system (not shown) of the platform 150.

Once the processor 151 of the platform 150 receives the coordinates of the position and velocity of the platform 150 and the coordinates of the position and velocity of the non-cooperative object 120, a guidance solution is computed and the guidance system of the platform 150 makes any necessary correction to the flight path of the platform 150 to ensure that it is on course to intercept the non-cooperative object 120. It should be noted that because the position and velocity of the platform 150 and of the non-cooperative object 120 are in the same coordinate frame, no frame alignment is needed, which provides the aforementioned advantages over the conventional command guidance fire control systems.

The processor 151 of the platform 150 could be responsible for computing the guidance solution or, alternatively, a separate processor on the platform 150 (not shown) could perform the task of computing the guidance solution. The platform 150 may be further arranged with a navigation control system or autopilot system (not shown) that includes a processor that converts the guidance solution into actual guidance commands or control signals that are then delivered to one or more servos or other control signal converters that adjust the position of one or more control surfaces (not shown) arranged on the platform 150. Such control systems change the direction of the platform 150 based on the guidance commands or control signals. The processor 151 of the platform 150 may generate the guidance commands and deliver them to the guidance system, or a processor of the autopilot system may perform this function. As will be understood by persons of skill in the art, in view of the description provided herein, processing tasks may be performed by a single processor or distributed across multiple processors.

The receiver subsystem 130 and the platform 150 determine differential time and/or phase and absolute time-of-arrival measurements of the uniquely coded signals transmitted from the set of antennas 228a-228n. These time-based measurements and knowledge of the speed of the signal propagation enable calculations to be made of the differential and absolute path lengths over which the signals have traveled. These measured path lengths, in conjunction with knowledge of the distributed layout of the antennas 228 of the SDA 110 and the known spatial relationship between the receiver subsystem 130 and the SDA 110, are used by the processor 131 and the processor 151 in the receiver subsystem 130 and the platform 150, respectively. Based on this information, the receiver subsystem 130 determines the position and motion of the non-cooperative object 120 relative to the SDA 110 and the platform 150 self-determines its position and motion relative to the SDA 110.

The determinations made by the receiver subsystem 130 are communicated to the SDA 110 and transmitted over-the-air to the platform 150. These determinations are then combined with the determinations made by the processor 151 of the platform 150 to provide the platform 150 with the position and motion of the non-cooperative object 120 relative to the platform 150 to compute a guidance solution.

The times-of-arrival of the transmitted uniquely coded signals 113 at the receiver subsystem 130 and the platform 150 are measured and the differences between these times are calculated. The differential time calculations obtained by the receiver subsystem 130 and knowledge of the layout of the SDA 110 and its spatial relationship with the antenna(s) 132 of the receiver subsystem 130 are used by the processor 131 to determine the path lengths from the antennas 228a-228n to the non-cooperative object 120. The differential time calculations obtained by the platform 150 and knowledge of the layout of the SDA 110 are used by the processor 151 to determine the path lengths from the antennas 228a-228n to the positioning antenna(s) 152 on the platform 150. Because the clocks that are used by the transmit signal generators 226a-226n, the receiver subsystem 130 and the platform 150 are synchronized, as described above with reference to FIG. 2B, FIG. 3B and FIG. 4B, the absolute arrival times of the signals can be determined by the receiver subsystem 130 and the platform 150. The absolute arrival times can be used to determine the absolute ranges, and consequently, the full position vectors can be determined. These same principles can be applied to locate and determine relative motion (if any) of cooperative objects that receive, modify and transmit modified versions of the N uniquely coded signals.

The processor 131 and the processor 151 determine the path lengths by measuring the difference in time-of-arrival of the signals as described above or by measuring the differential phase cp of the signals. Use of relative phase measurements is called interferometry. Interferometry requires coherence in the transmit signal generators 226a-226n. While either technique can be used to calculate the angle-of-arrival, the relative accuracy of the measurements is not the same. Interferometry improves the accuracy of this process by comparing the relative phase shifts of the received signals to provide a very accurate angle measurement.

In example embodiments motion is determined using the determined range and the differential change in the range of the signal propagation paths. Once the differential change in each path length has been determined, the combination of these values allows the platform 150 to self-determine its motion and allows the receiver subsystem 130 to determine the motion of the non-cooperative object 120 by multiplying the unit position vector by the differential path length change. The algorithms that are executed by the processor 151 and the processor 131 to compute the positions and motions of the non-cooperative object 120 and of the platform 150, respectively, include straight-forward trigonometric calculations as will now be described with reference to FIGS. 5-9.

FIG. 5 is a schematic diagram that illustrates the manner in which the position and orientation of a target or non-cooperative object 120 relative to the receiver platform 130 of FIG. 1 can be determined in two dimensions using trigonometry. An example spatial relationship (not to scale) between a set of antennas, $ANT_1$ and $ANT_2$, a receiver, RX1, and a reflective non-cooperative object or target 120 are shown in two dimensions in FIG. 5. An origin 10 is located equidistant between $ANT_1$ and $ANT_2$ when the distance a1 between the origin 10 and $ANT_1$ is equal to the distance $a_2$ between the origin 10 and the $ANT_2$. Stated another way, the origin 10 is the overall phase center of a spatially-distributed architecture of N antenna arrays comprising $ANT_1$ and $ANT_2$. The range, $|RSDC_{toTARGET}|$ from center of the SDA (i.e., origin 10) to the target 120 and angular position, $\theta_{TARGET}$, of the object relative to the origin 10 can be determined by the receiver subsystem 130 based on the known spatial relationship between the origin 10 and the antenna 132 by using the measurements of the difference in time-of-arrival of the signals as described above or the differences in the phase φ of the signals. The range, $|RSDC_{toRX1}|$, from origin 10 to the antenna 132 and the angular position, $\theta_{RX}$, of the antenna 132 relative to the origin 10 are known a priori. Consequently, the range, $|RRX_{toTARGET}|$, from the antenna 132 to the target 120 and the angle, $\varphi_{Object}$, of the target relative to the antenna 132 can be determined by the processor 131 of the receiver subsystem 130 using trigonometry, as will be understood by persons skilled in the art in view of the description provided herein.

FIG. 6 is a schematic diagram that illustrates the manner in which the position and orientation (not to scale) of the second receiver located on an platform 150 remote from the origin 10 defined by the SDA 110 of FIG. 1 can be determined in two dimensions using trigonometry. In FIG. 6, $a_1$, $a_2$, $RANT_{1toRX2}$, $RANT_{2toRX2}$, and $RSDC_{toRX2}$ are vectors. Given a known distance ($|a_1|,|-a_2|$) between the respective antennas $ANT_1$ and $ANT_2$ and the origin 10, the differential distance ($|RANT_{1toRX2}|-|RANT_{2toRX2}|$) from $ANT_1$ and $ANT_2$ to RX2 can be computed. RX2 is the overall phase center of the positioning antenna(s) 152 located on the platform 150. Using this information, the angle $\theta_{RX}$ can be determined, where $\theta_{RX}$ is the angle between the perpendicular to the line between the antennas $ANT_1$ and $ANT_2$ and the line to the antennas 152 from the origin 10. This may be accomplished by measuring the difference in time-of-arrival of the signals from each antenna 228a-228n (FIG. 2B) and multiplying by the speed of the signal propagation or by relating the phase difference to time difference. In two dimensions, the differential range measurements and the angle $\theta_{RX}$ are related by the equation, $$|RANT_{1toRX2}| - |RANT_{2toRX2}| = (|a_1 - a_2|)\sin\theta_{RX}, \quad \text{Equation 6}$$

If the receiver clock (e.g., clock 406) is synchronized with the transmitter clock (e.g., synchronization clock 224), it is possible to determine not only the relative difference in arrival time of the signals transmitted from $ANT_1$ and $ANT_2$ to RX2, but also the absolute arrival time of the transmitted signals at RX2. Using this information, it is then possible to determine the distance from RX2 to each of the antennas $ANT_1$ and $ANT_2$. Using standard trigonometric equations, the distance from RX2 to the origin 10 can be determined. As will now be described, this two-dimensional system can be extended easily to three dimensions by adding one or more additional antennas and one or more respective unique codes.

Figure 7:
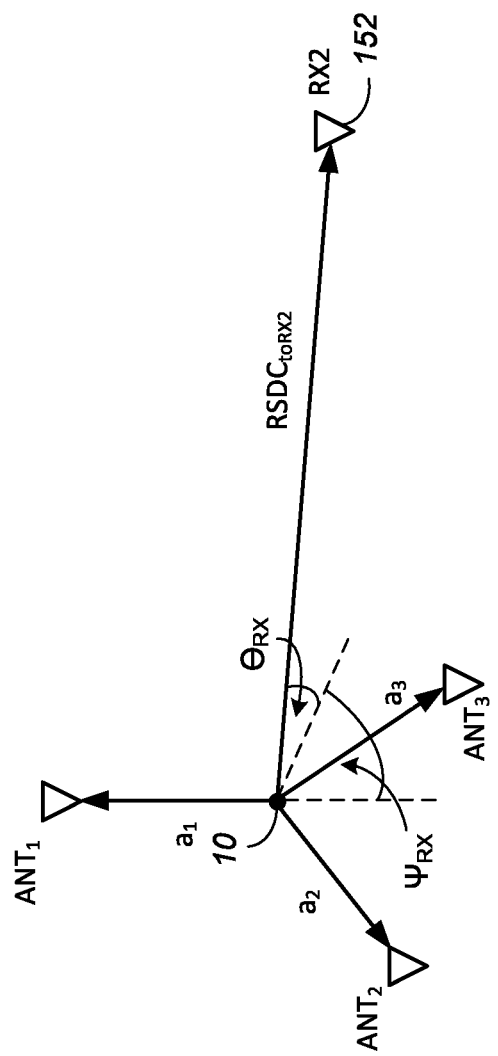
FIG. 7 is a schematic diagram that illustrates the manner in which the position and orientation of the second receiver relative to the SDA of FIG. 1 can be determined in three dimensions.

FIG. 7 is a schematic diagram that illustrates the manner in which the position and orientation (not to scale) of the second receiver located on an platform 150 remote from the origin 10 defined by the SDA 110 of FIG. 1 can be determined in three dimensions. The example embodiment shows relationships between three antennas, $ANT_1$, $ANT_2$ and $ANT_3$, and the positioning antennas 152 in the platform 150, labeled RX2, in three dimensions. As indicated, there are two angles ($\theta_{RX}$, $\psi_{RX}$) that need to be computed to determine position. However, these angles can be determined from algebraic equations with well-established solutions. The solution to the resulting position equations follows, under the assumption of synchronized clocks and that the coordinate frame center (e.g., origin 10) is located at the centroid of the antenna location vectors $a_1$, $a_2$, $a_3$, i.e., $$\text{Tx Center} = (0\ 0\ 0) = \frac{a_1 + a_2 + a_3}{3} \quad \text{Equation 7}$$

And it follows that $$|RSDC_{toRX2}|^2 = \frac{|RANT_{1toRX2}|^2 + |RANT_{2toRX2}|^2 + |RANT_{3toRX2}|^2}{3} - \frac{|a_1|^2 + |a_2|^2 + |a_3|^2}{3},$$

and assuming Tx Center=(0 0 0), $$RSDC_{toR\times 2} \cdot a_1 = \frac{|RANT_{1toRX2}|^2 - |RSDC_{toRX2}|^2 - |a_1|^2}{2}$$

$$RSDC_{toR\times 2} \cdot a_2 = \frac{|RANT_{2toRX2}|^2 - |RSDC_{toRX2}|^2 - |a_2|^2}{2}$$

$$RSDC_{toR\times 2} \cdot a_3 = \frac{|RANT_{3toRX2}|^2 - |RSDC_{toRX2}|^2 - |a_3|^2}{2}$$

The term $RSDC_{toRX2}$ represents the vector from the center of the array of N antennas or origin 10, to the receiver center, RX2, or antenna 152 (when one antenna is used). The terms $RANT_{1toRX2}$, $RANT_{2toRX2}$, $RANT_{3toRX2}$ represent the vectors from the antennas $ANT_1$, $ANT_2$ and $ANT_3$, respectively, to RX2. The terms $a_1$, $a_2$, and $a_3$ represent the vectors from the origin 10 to each of the antennas $ANT_1$, $ANT_2$ and $ANT_3$, respectively. The derivation of these equations will be understood by those skilled in the art in view of this description.

Figure 8:
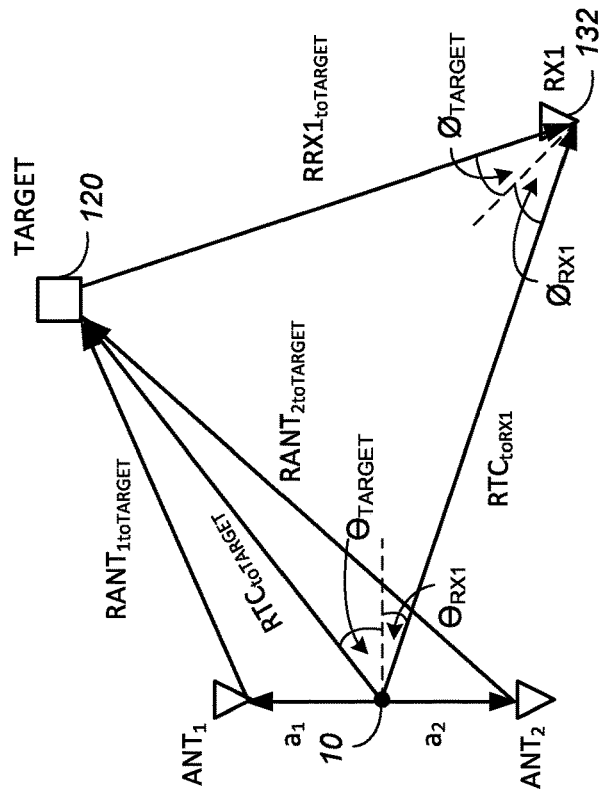
FIG. 8 is a schematic diagram that illustrates spatial relationships in an example arrangement of a SDA, receiver and a non-cooperating object of FIG. 1 in two dimensions.

FIG. 8 is a diagram that illustrates the relationship, in two dimensions, between two antennas, $ANT_1$ and $ANT_2$, one receiver platform antenna 132, RX1, and a target or non-cooperative object 120 being tracked. It should be noted once again, that in three dimensions, there are more choices for how to arrange the antennas. In addition, there are more equations to be solved and two angles that need to be computed to determine position. However, as indicated above, the equations that may be used for this are algebraic equations with well-established solutions that will be understood by those skilled in the art.

Because the position of the first receiver subsystem 130 relative the SDA 110 is known a priori, the position of any object reflecting the uniquely coded transmitted signals 113 towards the first receiver subsystem 130 and more specifically the antenna (or RX1) 132 can be determined. With reference to FIG. 8, the values of the vectors ($a_1$, $a_2$, $RTC_{toRX1}$) and the angles $\theta_{RX}$ and $\emptyset_{RX1}$ are all known, while the values of the vectors ($R_{TCtoTARGET}$, $RRX1_{toTARGET}$, $RANT_{1toTARGET}$, $RANT_{2toTARGET}$) and the angles $\theta_{TARGET}$ and $\emptyset_{TARGET}$ are unknown. However, because the signals that reflect off of the object share a common path along $RRX1_{toTARGET}$, the difference in arrival times at the receiver subsystem 130 is entirely due to the difference in length of the vectors $RANT_{1toTARGET}$ and $RANT_{2toTARGET}$. This information is enough to allow the angle of the target relative to the antennas 228a-228n to be calculated in the coordinate frame 5 defined by the positions of the antennas. In two dimensions, assuming $$|a_1| = |a_2|,$$

the differential range measurements and the angle relative to the SDA center or origin 10 are related by the equation:

$$|RANT_{1toTARGET}| - |RANT_{2toTARGET}| = (|a_1 - a_2|)\sin\theta_{TARGET}.$$

As stated above, if the local clocks of the SDA 110 and the receiver subsystem 130 are synchronized, it is possible to determine not only the relative difference in arrival time of the signals from each antennas 228a-228n, and consequently the angular position of the target 120, but also the absolute arrival time of the transmitted signals, which, in conjunction with the known position of the receiver subsystem 130 relative to the origin 10, gives the range of the target 120 in the coordinate system 5 determined by the location of the antennas 228 in the SDA 110. However, unlike the calculation used to determine the range of the receiver, this calculation requires the simultaneous solution of intersecting ellipses. Methods exist, such as, for example, the gradient descent and Newton-Raphson methods, that are suitable for use with the invention to solve the resulting set of equations. Those skilled in the art will understand the manner in which these or other methods may be used to make these calculations. This two-dimensional system can be extended easily to three dimensions by using one or more additional antennas that broadcast one or more respective uniquely coded signals.

Figure 9:
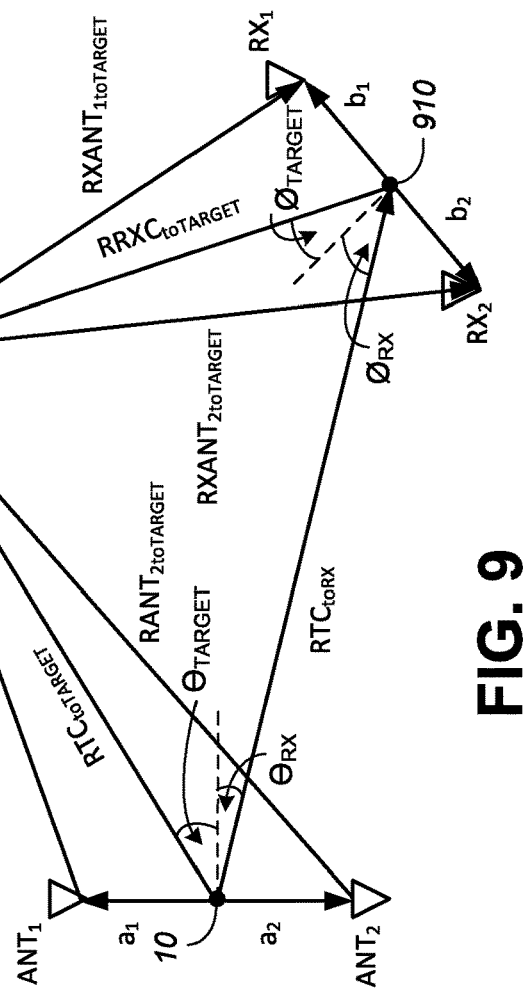
FIG. 9 is a schematic diagram that illustrates spatial relationships in an example arrangement of a SDA, a receiver with multiple antennas and a non-cooperative object of FIG. 1 in two dimensions.

FIG. 9 is a schematic diagram that illustrates spatial relationships in an example arrangement of a SDA 110, a receiver subsystem 130 with multiple antennas and a non-cooperative object or target 120 of FIG. 1 in two dimensions. In this embodiment, two spatially distributed receivers $RX_1$ and $RX_2$ are coupled to or provided by the receiver platform 130. A center 910 of the spatially-distributed receiver antennas $RX_1$ and $RX_2$ is located equidistant between $RX_1$ and $RX_2$ when the distance $b_1$ between center 910 and $RX_1$ is equal to the distance $b_2$ between center 910 and the $RX_2$. Stated another way, the center 910 is the overall phase center of a spatially-distributed architecture of N antenna arrays comprising $RX_1$ and $RX_2$. The manner in which the position of the target 120 can be calculated using the path length differences resulting from the use of both distributed SDA antennas that define origin 10 and distributed receivers that define a phase center 910 will now be described with reference to FIG. 9. In this example, it is assumed that the values of the vectors $a_1$, $a_2$, $b_1$, $b_2$, $RTC_{toRXc}$ and angles $\theta_{RX}$ and $\emptyset_{RX}$ are all known, while the values of the vectors $RTC_{toTARGET}$, $RANT_{1toTARGET}$, $RANT_{2toTARGET}$, and $RRX_{1toTARGET}$ and the angles $\theta_{Target}$ and $\emptyset_{TARGET}$ are unknown. However, because the signals that reflect off of the object share a common path along $R_{RXANT1toTARGET}$ and a separate common path along $R_{RXANT2toTARGET}$, the difference in arrival times at the respective receiver platform antennas is entirely due to the difference in the lengths of the vectors $RANT_{1toTARGET}$ and $RANT_{2toTARGET}$. This information is enough to allow the angle of the object, $\theta_{TARGET}$, relative to the origin 10 to be calculated in the coordinate frame 5 defined by the location of the antennas 228a-228n in the SDA of antenna arrays 112. In two dimensions assuming $$|a_1| = |a_2|,$$

the differential range measurements and the angle of the object relative to the origin 10 are related by the equation:

$$|RANT_{1toTARGET}| - |RANT_{2toTARGET}| = (|a_1 - a_2|)\sin\theta_{TARGET}.$$

In two dimensions assuming $b_1=b_2$, the differential range measurements and the angle of the target relative to the center 910 of the receiver antennas $RX_1$ and $RX_2$ are related by the equation:

$$|RXANT_{1toTARGET}| - |RXANT_{2toTARGET}| = (|b_1 - b_2|)\sin\phi_{TARGET}.$$

The length or range of the vector $RXANT_{1toTARGET}$ can be determined by the difference of the total range of the reflected versions of the uniquely coded signals received at $RX_1$ and the lengths of the vectors $RANT_{1toTARGET}$ and $RANT_{2toTARGET}$. Similarly, the length or range of the vector $RXANT_{2toTARGET}$ can be determined by the difference of the total range of the reflected versions of the uniquely coded signals received at $RX_2$ and the lengths of the vectors $RANT_{1toTARGET}$ and $RANT_{2toTARGET}$. This two-dimensional system can be extended to three dimensions.

Figure 10:
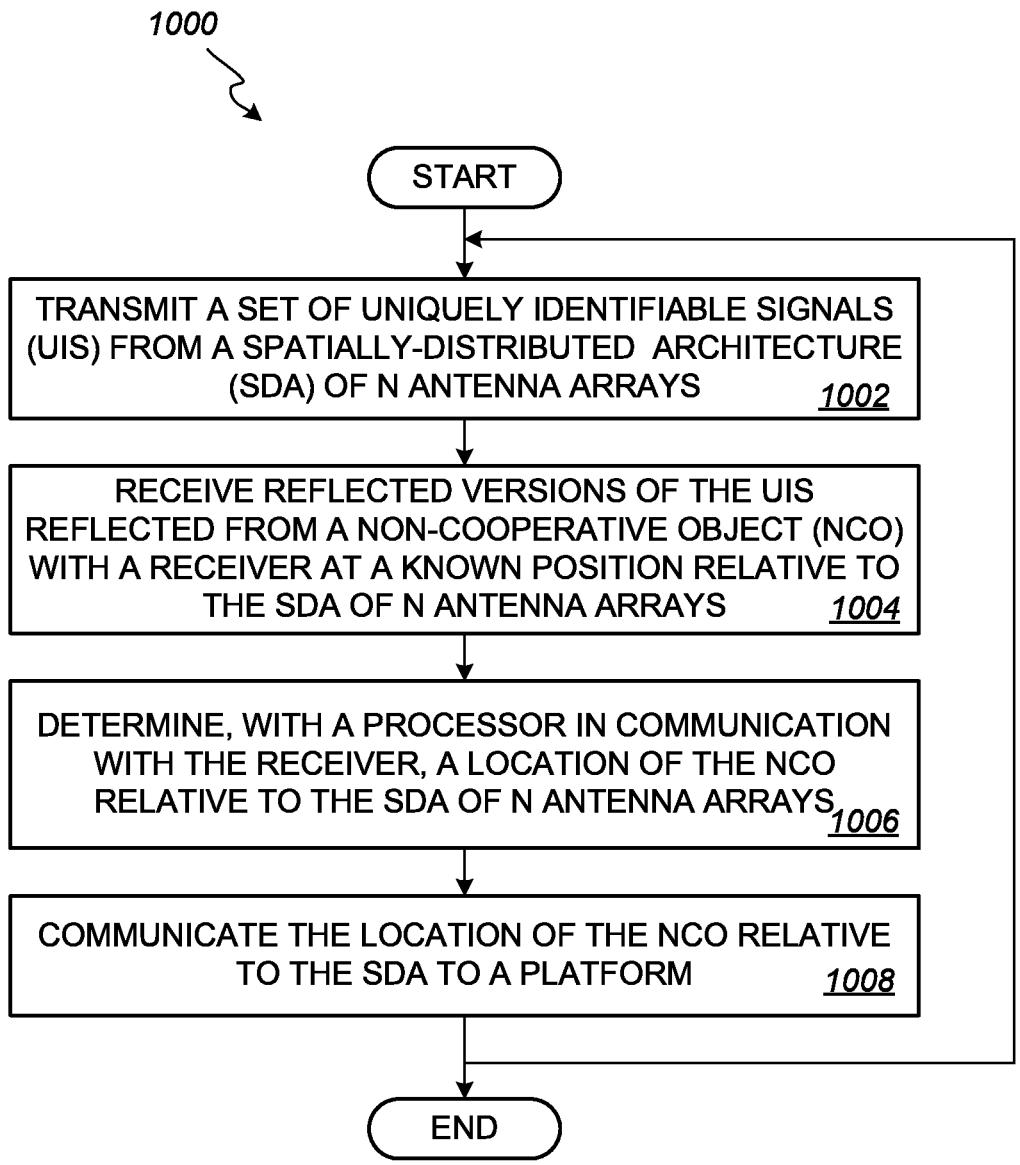
FIG. 10 is a flow diagram illustrating an example embodiment of a method for locating a non-cooperative object relative to a platform.

FIG. 10 illustrates an example embodiment of a method 1000 that can be performed by SDA 110 to determine a position of a non-cooperative object 120 relative to the SDA 110 and to communicate the position to a platform 150 remote from the SDA 110. The method 1000 begins with block 1002 where the SDA 110 transmits a set of uniquely identifiable signals from respective spatially-distributed antenna arrays 112. In block 1004, a receiver or receiver subsystem 130 located at a known position relative to the antenna arrays 112, receives reflected versions 114 of the uniquely identifiable signals 113 reflected from the non-cooperative object 120. In block 1006, a processor 131 in communication with the receiver or receiver subsystem 130 determines a location of the non-cooperative object 120 relative to a coordinate system 5 defined by the antenna arrays 112. Thereafter, as indicated in block 1008, the SDA 110 communicates the location of the non-cooperative object 120 in the coordinate system 5 to one or more platforms 150.

Figure 11:
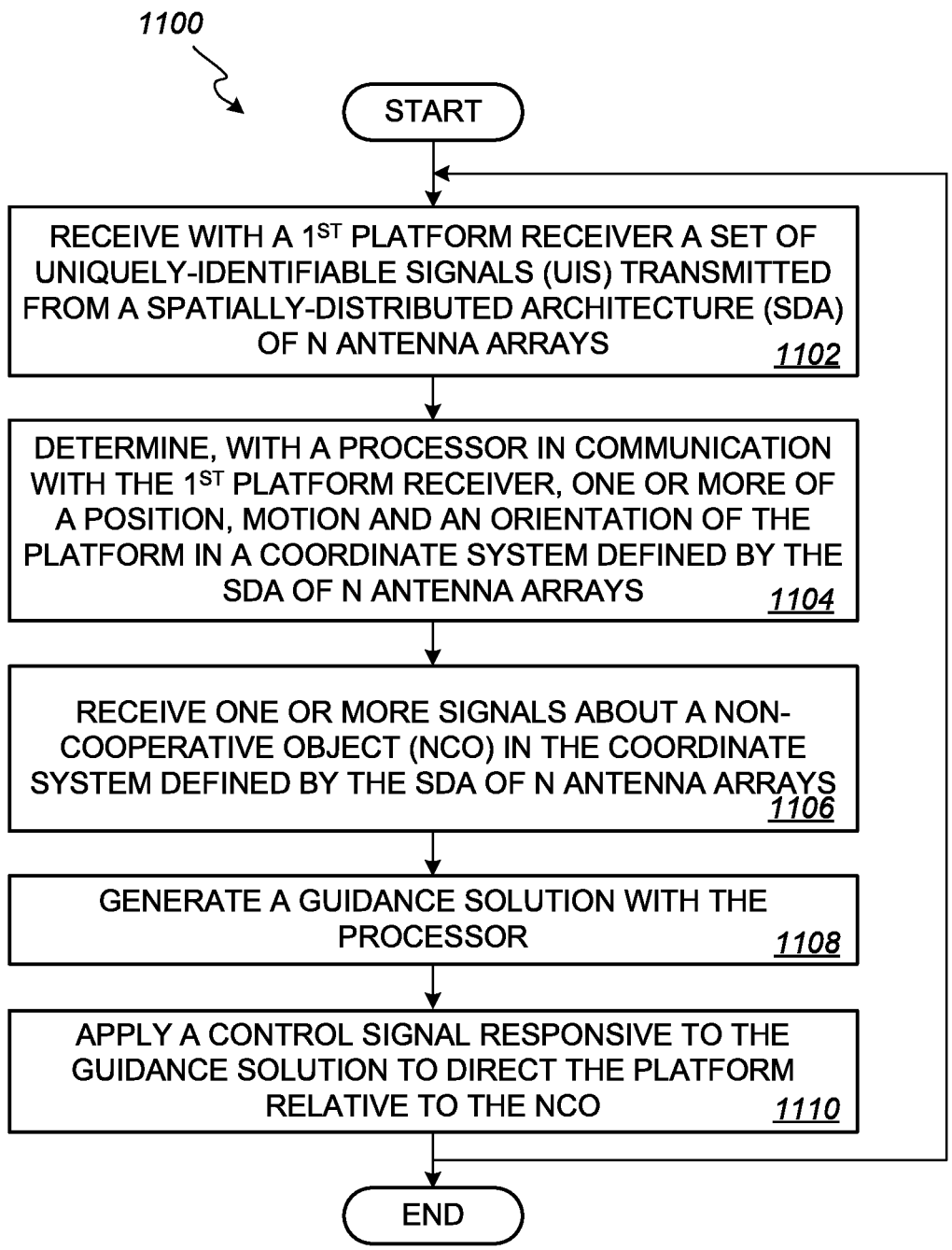
FIG. 11 is a flow diagram illustrating an example embodiment of a method for self-determining one or more of a position, motion and orientation in a coordinate system and guiding a platform relative to a remote non-cooperative object.

FIG. 11 illustrates an example embodiment of a method 1100 that can be performed by a platform 150. The method 1100 enables the platform 150 to self-determine a platform position in a coordinate system 5 defined by a spatially-distributed architecture of antenna arrays 112 and to use information received from the spatially-distributed architecture of antenna arrays 112 regarding the location of a non-cooperative object 120. The platform 150 uses the location of the non-cooperative object 120 to guide the platform 150 relative to the non-cooperative object 120. The method begins with block 1100 where a first platform receiver located on the platform 150 receives a set of uniquely identifiable signals from respective spatially-distributed antenna arrays 112. In block 1104, a processor 151 in communication with the first platform receiver, determines one or more of position, motion and orientation of the platform in the coordinate system 5 based on characteristics of the uniquely identifiable signals 113 transmitted from the spatially-distributed architecture of antenna arrays 112. In block 1106, the platform 150 receives one or more information signals 115 that contain information about the location of the non-cooperative object 120 in the coordinate system 5. In block 1108, the processor 151 generates a guidance solution based on the position, motion and orientation of the platform relative to the position and motion (if any) of the non-cooperative object 120 in the coordinate system 5. In block 1110, a control signal responsive to the guidance solution is forwarded to a control system on the platform 150 to direct the platform 150 relative to the non-cooperative object 120.

The illustrated embodiments provide a system where a platform(s) 150 no longer has to rely on inertial guidance systems to direct the platform 150 on a trajectory or path toward the non-cooperative object or target 120. Since the receiver subsystem 130 tracks the location of the target 120 and the platform 150 self-locates its position in a common coordinate system 5, a processor (e.g., the processor 151) need not perform a coordinate translation before determining a guidance solution from these inputs.

In addition, since tracking of the target 120 by the receiver subsystem 130 and the platform 150 self-tracking are performed in a common reference frame 5 defined by the locations of the antennas 228a-228n in the SDA 110, a transition of the responsibility for tracking the target or non-cooperative object 120 can be transferred to the platform 150 from the receiver subsystem 130 without a need for a coordinate translation. The hand off or transfer is efficient as a single filter can be used for both the N uniquely coded signals 113 and the reflected versions 114 of the N uniquely coded signals 113, thereby reducing the possibility of filter transients as a result of the transition. From the time of transition until interception, the platform 150 continues to self-track while also tracking the target 120. The same principles described above with reference to FIGS. 5-9 apply to the operations performed by the platform 150 to self-track while also tracking the non-cooperative object or target 120.

In addition, when a platform 150 is arranged with optional antennas 154 arranged to receive an indication of the location and motion (if any) of the target 120 the platform 150 continues to self-track its position and motion relative to the origin 10 of the coordinate system 5, while the additional antenna 154 receives the target tracking information from the external source 180 and delivers it to the guidance system (not shown) of the platform 150. For example, the position and motion of the target 120 as measured by the external source 180 may be in a coordinate system defined by or provided to an inertial sensor (not shown) of the external source 180. The platform 150 will receive the information in that alternative coordinate system from the external source 180 and transform it into the coordinate frame 5 defined by the locations of the transmitters 228a-228n in the SDA 110. The guidance system of the platform 150 then uses this transformed or converted information to adjust its flight path or direction, if necessary, such that it converges with the non-cooperative object 120 when so desired. Alternatively, the guidance system (not shown) of the platform 150 uses the information to adjust its path, if necessary, such that its path orbits or otherwise avoids the non-cooperative object 120 when so desired.

Bistatic Orthogonal Interferometry

As described briefly above, the OSP processing can be applied to bistatic interferometry in order to cancel unwanted interference and simultaneously measure angle-of-arrival for targets of interest using relative phase measurements. As shown in FIG. 12, a basic bistatic orthogonal interferometer consists of a transmit system and a receive system that can be physically separated from each other. The transmit system consists of 2 or more distributed transmit antennas that transmit coherent and distinct waveforms from each transmitter. The receive system consists of 2 or more distributed receive antennas where the receivers associated with each antenna are coherent with each other. FIG. 12 shows two (2) distributed transmit antennas separated by a distance $D_{Tx}$ and two (2) distributed receive antennas separated by a distance $D_{Rx}$. The transmitted waveforms are reflected from a target and all waveforms are combined at each of the receive antennas. The target is assumed to be located at an angle $\theta_T$ with respect to the transmit system. For a bistatic interferometer with 2 transmit antennas and 2 receive antennas it is possible to locate the target in angle and to cancel one jammer. FIG. 12 shows a jammer located at an angle $\theta_J$ with respect to the receive antenna system.

The signals transmitted by transmitter k and received at receiver l can be defined as a 2×2 matrix. Where the range quantities $R_j$ are determined as described above for the positions of the respective transmitter arrays and receiver antenna arrays as illustrated schematically in FIG. 12.

$$S(1,1,:) = a \cdot e^{2\pi j(R_1+R_3)} F_1$$
$$S(1,2,:) = a \cdot e^{2\pi j(R_1+R_4)} F_1$$
$$S(2,1,:) = a \cdot e^{2\pi j(R_2+R_3)} F_1$$
$$S(2,2,:) = a \cdot e^{2\pi j(R_2+R_4)} F_1$$

$$S: \prod_{range} \times \left( \prod_{angle\_rec} \oplus \prod_{angle\_trans} \right) \to \Omega_{f\_fast-time} \times (\Omega_{f\_spatial} \oplus \Omega_{f\_spatial}) \subset \mathbb{C}^N \times (\mathbb{C}^2 \oplus \mathbb{C}^2)$$

Where N is the number of range cells defined by the range processing of the orthogonal waveforms. Assume that a jammer is located at an angle $\theta_J$ relative to the two receive antenna arrays. Then, the signals received from the jammer can be defined by, $$J(1,:) = A_J e^{-\frac{2\pi j}{\lambda} \cdot \frac{D_{Rx}}{2} \sin(\theta_J)} F_J$$
$$J(2,:) = A_J e^{\frac{2\pi j}{\lambda} \cdot \frac{D_{Rx}}{2} \sin(\theta_J)} F_J$$
$$J: \prod_{angle\_rec} \times \prod_{range} \to \Omega_{f\_spatial} \times \Omega_{f\_fast-time} \subset \mathbb{C}^2 \times \mathbb{C}^N$$

For each of the two receivers the signal+jammer+noise is defined by, $$SPJ(1,:) = A \cdot e^{2\pi j(R_1+R_3)} F_1 + A \cdot e^{2\pi j(R_2+R_3)} F_2 + J(1,:) + N_1$$
$$SPJ(2,:) = A \cdot e^{2\pi j(R_1+R_4)} F_1 + A \cdot e^{2\pi j(R_2+R_4)} F_2 + J(2,:) + N_2$$

The vector SPJ can be expressed as follows:

$$SPJ = S \begin{bmatrix} 1 \\ 1 \end{bmatrix} + J + N$$

$$SPJ: \prod_{angle\_rec} \times \prod_{range} \to \Omega_{f\_spatial} \times \Omega_{f\_fast-time} \subset \mathbb{C}^2 \times \mathbb{C}^N$$

Define $F^\perp$ as the waveform orthogonal to $F_1$ and $F_2$ and define the convolution matrix, GG, as follows, $$GG = \begin{bmatrix} F^\perp(1:N) \\ [F^\perp(N) F^\perp(1:N-1)] \\ [F^\perp(K:N) F^\perp(1:K-1)] \end{bmatrix} K lags$$

Applying the matrix GG to the vector SPJ is equivalent to performing a convolution operation with K lags.

$$SJJ = GG \cdot SPJ^H$$

$$SJJ: \prod_K \times \prod_{angle\_rec} \to \Omega_{f\_fast-time} \times \Omega_{f\_spatial} \subset \mathbb{C}^K \times \mathbb{C}^2$$

A covariance matrix is defined based on the K lags in the convolution operation.

$$Q = SJJ^H \cdot SJJ$$

Thereafter, a matched filter is defined at the $L^{th}$ lag.

$$SM = \begin{bmatrix} F_1(L:N) & F_1(1:L-1) \\ F_2(L:N) & F_2(1:L-1) \end{bmatrix} \cdot SPJ^H$$

$$SM: \left( \prod_{angle\_rec} \oplus \prod_{angle\_rec} \right) \to (\Omega_{f\_spatial} \oplus \Omega_{f\_spatial}) \subset (\mathbb{C}^2 \times \mathbb{C}^N)$$

For the $L^{th}$ range bin the Bistatic Array Information Matrix (BAIM) can be defined using modifications of various conventional cancellation methods. For example, applying the Generalized Sidelobe Canceller (GSC) and Capon's Method it follows, $$SN = SM - SPJ \cdot GG^H \cdot SJJ \cdot (Q^T)^{-1} \cdot SM \quad \text{GSC Method}$$

or $$SN = (Q^T)^{-1} \cdot SM \quad \text{Capon's Method}$$
$$SN \subset \mathbb{C}^2 \times \mathbb{C}^2$$

With the interference cancelled, angle of arrival can be computed using the BAIM and standard interferometry.

$$\Delta\varphi = \frac{1}{2}\angle(SN(1,1) \cdot SN(1,2)' \cdot SN(2,1) \cdot SN(2,2)')$$

$$\theta = \sin^{-1}\left(\frac{\Delta\varphi}{2\pi D_{Tx}}\right)$$

Bistatic Orthogonal Array for RF Interference Mitigation

Generalizing the formalism above to arrays with multiple transmit and receive antenna arrays where each transmit array is transmitting an uniquely identifiable waveform that is separable by each of the receivers to mitigate RF interference. Define a transmit only array with $N_T$ elements and a receive-only array with $N_R$ elements. Assume $N_T$ signals are transmitted from each transmit antenna and are reflected from a number of targets $M_T < N_T$ and all reflected waveforms are received by each of the $N_R$ antennas.

$$S(k, l:) = a_{k,l} \cdot e^{2\pi j(r_k + R_l)} F_k$$

$$S: \prod_{range} \times \left(\prod_{angle\_rec} \oplus \prod_{angle\_trans}\right) \rightarrow$$

$$\Omega_{f\_fast-time} \times (\Omega_{f\_spatial} \oplus \Omega_{f\_spatial}) \subset \mathbb{C}^N \times (\mathbb{C}^{N_R} \oplus \mathbb{C}^{N_T})$$

Again, where N is the number of range cells defined by the processing of the orthogonal waveforms. Assume $M_J$ number of jammers where $M_J < N_R$.

$$J(m, l:) = A_{m,l} e^{\frac{2\pi j}{\lambda} \cdot d_l \sin(\theta_m)} E_m$$

$$J: \prod_{angle\_rec} \times \prod_{range} \rightarrow \Omega_{f\_spatial} \times \Omega_{f\_fast-time} \subset \mathbb{C}^{N_R} \times \mathbb{C}^N$$

The combination of signal and jammer received at each receiver l in the receive array is as follows.

$$SPJ(l,:) = \sum_{k=1}^{M_T} S(k, l,:) + \sum_{m=1}^{M_J} J(l,:) + N_l$$

$$SPJ: \prod_{angle\_rec} \times \prod_{range} \rightarrow \Omega_{f\_spatial} \times \Omega_{f\_fast-time} \subset \mathbb{C}^{N_R} \times \mathbb{C}^N$$

Define GG as the matrix that consists of K shifts of the waveform $F^\perp F$ that is orthogonal to all of the waveforms $F_k$.

$$GG = \begin{bmatrix} F^\perp(1:N) \\ [F^\perp(N)F^\perp(1:N-1)] \\ [F^\perp(K:N)F^\perp(1:K-1)] \end{bmatrix} K lags$$

The interference canceller is defined as, $$SJJ = GG \cdot SPJ^H$$

$$SJJ: \prod_K \times \prod_{angle\_rec} \rightarrow \Omega_{f\_fast-time} \times \Omega_{f\_spatial} \subset \mathbb{C}^K \times \mathbb{C}^{N_R}$$

$$Q = SJJ^H \cdot SJJ$$

$$SM = \begin{bmatrix} [F_1(L:N) & F_1(1:L-1)] \\ [F_2(L:N) & F_2(1:L-1)] \\ \vdots \\ [F_{N_T}(L:N) & F_{N_T}(1:L-1)] \end{bmatrix} * SPJ^H$$

$$SM: \prod_{range} \oplus \left(\prod_{angle\_rec} \oplus \prod_{angle\_rec}\right) \rightarrow$$

$$\Omega_{f\_fast-time} \oplus (\Omega_{f\_spatial} \oplus \Omega_{f\_spatial}) \subset \mathbb{C}^{N_R} \oplus (\mathbb{C}^{N_R} \oplus \mathbb{C}^{N_R})$$

For each range cell L, the BAIM can be defined using conventional cancellation methods such as the GSC and Capon's Method as follows.

$$SN(k,:,:) = \quad \text{(GSC)}$$
$$SM(k,:,:) - (SPJ * GG^H)_k \cdot SJJ(k,:,:) \cdot (Q^T)^{-1} \cdot SM(k,:,:)$$

or $$SN(k,:,:) = (Q^T)^{-1} \cdot SM(k,:,:) \quad \text{(Capon's Method)}$$
$$SN(k,:,:) \subset \mathbb{C}^{N_T} \times \mathbb{C}^{N_R}$$

At each of the receive arrays angle of arrival can be extracted from the matrix SN using any of a multitude of techniques such as interferometry, maximum likelihood, or even nonlinear estimation algorithms.

$$\hat{\theta}(k, l) = \angle SN(k, l,:)$$

In addition, by using the angle estimate from each of the receivers an improved angle estimate can be computed.

$$\theta_k = \sum_{l=1}^{N_R} \hat{\theta}(k, l)$$

Note that the receive array is used to cancel the interference while the transmit array is used to determine angle of arrival in a coordinate frame defined by the transmit array.

$$FSN = \sum_{k=1}^{N_R} FFT(SN(:,k))$$

$$\hat{\theta} = \max_{\theta}(\|FSN\|)$$

Note further that angle of arrival can be computed at each range cell k where the signal-to-interference plus noise (SINR) is sufficient to declare a potential target and where, $$SINR(k) = SN(k, 1, 1)^2 + SN(k, 2, 2)^2$$

Clutter Cancellation Using Waveform Separability

If it is assumed that the transmitters are collocated for the bistatic orthogonal interferometer then angle of arrival can no longer be computed since the interferometer baseline is zero. However, if separable waveforms are transmitted from a single transmitter (i.e., the degenerate bistatic interferometer case) then interference cancellation is still possible using the Doppler domain to cancel interference. The assumption for this case is that the signal and unwanted interference are discrete and have supports that are disjoint in the Doppler frequency domain. Being discrete requires that unwanted interference be defined as a sum of a finite number of Doppler frequencies and having disjoint support means that the Doppler intervals over which the signal and the interference are defined do not overlap. A third requirement is that the unwanted interference is not compressible by a matched filter defined by the separable waveforms. An example that satisfies the above three requirements is a dynamic target embedded in clutter where the clutter Doppler frequency is at or near zero Doppler. When the target velocity is large enough to bring it out of the clutter but the return is weak enough to mask the target return in the Doppler sidelobes of the clutter, all three requirements are met to permit clutter cancellation. The number of separable waveforms that must be transmitted simultaneously is determined by the number of Doppler frequencies required to represent the clutter spectrum. If the number of Doppler frequencies is $N_D$ then the number of separable waveforms required to be transmitted is $N_D+1$.

The case for N=1 will be presented. For that case we have two separable waveforms transmitted simultaneously where the waveform is a pulse-Doppler waveform with M number of pulses defined by, $$S_1 = a \cdot e^{2\pi j \cdot f_{target-Dop} \frac{[0 \ldots M-1]}{PRF}} F_1$$

$$S_2 = a \cdot e^{2\pi j \cdot f_{target-Dop} \frac{[0 \ldots M-1]}{PRF}} F_2$$

$$S_k : \Pi_{range} \times \Pi_{Doppler} \to \Omega_{f\_fast-time} \times \Omega_{f\_slow-time} \subset \mathbb{C}^N \times \mathbb{C}^M$$

Where $f_{target-dop}$ defining the target signature of the clutter, N is the number of phase states that define the waveforms, and M is the number of pulses in a dwell.

Then the signals received from the clutter return can be defined by, $$J = a \cdot e^{2\pi j \cdot f_{clutter-Dop} \frac{[0 \ldots M-1]}{PRF}} \cdot e^{2\pi j \cdot rand([0 \ldots N-1])'}$$

$$J : \Pi_{range} \times \Pi_{Doppler} \to \Omega_{f\_fast-time} \times \Omega_{f\_slow-time} \subset \mathbb{C}^N \times \mathbb{C}^M$$

Where $f_{clutter-dop}$ defines the Doppler signature of the clutter.

For each of the received waveforms the signal+clutter+noise is defined by, $$SPJ = S_1 + S_2 + J + N$$

$$SPJ : \Pi_{range} \times \Pi_{Doppler} \to \Omega_{f\_fast-time} \times \Omega_{f\_slow-time} \subset \mathbb{C}^N \times \mathbb{C}^M$$

$$SF = fft(SPJ)$$

Define $F_3$ and $F_4$ as waveforms orthogonal to all of the circular shifts of $F_1$ and $F_2$ and the matched filter for the $k^{th}$ range cell is as follows, $$SM_k = \begin{Bmatrix} F1_k \cdot SF^H \\ F2_k \cdot SF^H \end{Bmatrix}$$

$$SM_k : \Pi_{Doppler} \times \Pi_2 \to \Omega_{f\_slow-time} \times \Omega_2 \subset \mathbb{C}^N \times \mathbb{C}^2$$

where $F1_k$ and $F2_k$ represent the $k^{th}$ circular shift of F1 and F2, respectively. A mismatched filter can be defined as follows, $$JM_k = \begin{bmatrix} F3_k \cdot SF^H \\ F4_k \cdot SF^H \end{bmatrix}$$

$$JM_k : \Pi_{Doppler} \times \Pi_2 \to \Omega_{f\_slow-time} \times \Omega_2 \subset \mathbb{C}^N \times \mathbb{C}^2$$

where $F3_k$ and $F4_k$ represent the $k^{th}$ circular shift of F3 and F4, respectively. A covariance matrix can be defined.

$$Q_k = JM_k \cdot JM_k^H$$

One example cancellation algorithm is as follows, $$SN_k = JM_k \cdot SM_k^H \cdot Q_k \cdot JM_k$$

$$SN \subset \mathbb{C}^2 \oplus \mathbb{C}^2$$

The Doppler profile $RD_k$ for the $k^{th}$ range cell is defined by, $$RD_k = \frac{1}{2}(SN_k(1,:) + SN_k(2,:))$$

It should be noted that this disclosure has been presented with reference to one or more exemplary or described embodiments for the purpose of demonstrating principles and concepts. The claimed systems are not limited to these example embodiments. As will be understood by persons skilled in the art, in view of the description provided, many variations may be made to the example embodiments and all such variations are within the scope of the invention.

| REFERENCE SYMBOLS | |
|---|---|
| 5 | coordinate system |
| 10 | origin |
| 12 | X-axis |
| 13 | Y-axis |
| 14 | Z-axis |
| 100 | environment |
| 110 | spatially-distributed architecture |
| 110' | spatially-distributed architecture |
| 111 | signal generator |
| 112 | N antenna arrays |
| 113 | N uniquely coded signals |
| 114 | reflections (of coded signals) |
| 115 | information signal |
| 117 | N uniquely coded signals (modified) |
| 120 | non-cooperative object (target) |
| 122 | cooperative object |
| 130 | first receiver subsystem |
| 131 | processor |
| 132 | antenna(s) |
| 135 | memory |
| 138 | signal generator |
| 139 | connection |
| 140 | signal |
| 150 | platform(s) |
| 151 | processor |
| 152 | antenna(s) |
| 154 | antenna (optional) |
| 155 | memory |
| 180 | alternate signal source |
| 185 | information signal |
| 201 | SDA subsystem |
| 202 | processor |
| 203 | input/output interface |
| 204 | clock generator |
| 205 | memory |
| 206 | bus |
| 211 | signal generator |
| 212 | Local info. store |
| 213 | TX module |
| 214 | RX module |
| 215 | code store/signal gen. |
| 216 | connection |
| 217 | connection |
| 220 | SDA circuitry |
| 220' | SDA circuitry |
| 221 | TX circuitry |
| 221' | TX circuitry |
| 222 | RX circuitry |
| 223 | master oscillator |
| 224 | synchronization clock |
| 225 | connection |
| 226 | TX signal generator |
| 228 | N antenna arrays |
| 330 | receiver platform |
| 330' | receiver platform |
| 331 | processor |
| 331' | processor |
| 332 | bus |
| 333 | input/output interface |
| 334 | clock generator |
| 335 | memory |
| 336 | location module |
| 337 | motion module |
| 338 | information signal logic |
| 339 | local info store |
| 342 | connection |
| 350 | demodulator |
| 360 | matched filter bank |
| 400 | platform |
| 400' | platform |
| 402 | phase-locked loop (PLL) |
| 404 | local oscillator |

| REFERENCE SYMBOLS | |
|---|---|
| 405 | summing node |
| 406 | clock |
| 410 | RX/demodulator |
| 411' | processor |
| 411' | processor |
| 412 | bus |
| 413 | input/output interface |
| 414 | clock generator |
| 415 | memory |
| 416 | connection |
| 417 | connection |
| 420 | matched filter bank |
| 431 | location module |
| 432 | motion module |
| 433 | orientation module |
| 434 | second module |
| 435 | signal generator |
| 436 | conversion module |
| 437 | coordination module |
| 438 | local info store |
| 450 | platform circuitry |
| 460 | receiver |
| 465 | antenna |
| 910 | RX array center |
| 1000 | SDA method |
| 1002-1008 | SDA method steps |
| 1100 | platform method |
| 1102-1110 | platform steps |

What is claimed is:

1. A system for mitigating electromagnetic interference, the system comprising:
   a set of spatially separated transmit antenna elements (SSTAE), the SSTAE having at least T members transmitting T unique waveforms, respectively, where T is a positive integer greater than or equal to two;
   a set of spatially separated receive antenna elements (SSRAE), the SSRAE having at least R members receiving the T unique waveforms, where R is a positive integer greater than or equal to two;
   a circuit assembly electrically coupled to the set of SSRAE, the set of SSRAE providing respective electrical signals responsive to the T unique waveforms, the respective electrical signals including at least one target signal and electromagnetic interference, the circuit assembly operating on the respective electrical signals to create a matched projection space parallel to a reference vector related to the at least one target signal and operating on the respective electrical signals to create a second projection space that is orthogonal or nearly orthogonal to the matched projection space, the second projection space including the electromagnetic interference but not the at least one target signal, wherein the circuit assembly uses the second projection space and the matched projection space to separate the electromagnetic interference from the at least one target signal.

2. The system of claim 1, wherein unique waveforms from T SSTAE are used to determine a target angle and R unique waveforms at the SSRAE are used to cancel the electromagnetic interference;
   wherein the SSTAE transmit a sequence of unique waveforms that are used for Doppler processing in the circuit assembly electrically coupled to the set of SSRAE.

3. The system of claim 1, wherein the circuit assembly separates the electromagnetic interference from the target signal prior to formation of an image space.

4. The system of claim 1, wherein the SSTAE are not co-located with the SSRAE.

5. The system of claim 1, wherein a separation space is defined by an angle-of-arrival; and wherein electromagnetic interference is localized in the angle-of-arrival.

6. The system of claim 1, wherein a separation space is defined by Doppler frequencies; and wherein electromagnetic interference is localized in Doppler frequencies.

7. A system for target location and interference cancellation using minimal antenna resources, the system comprising:
   $N_T$ processing circuits electrically coupled to $N_T$ transmit antenna elements, the $N_T$ processing circuits configured to send an electrical signal to at least one of $N_T$ transmit antenna elements, where $N_T$ is a positive integer and where each of the $N_T$ transmit antenna elements transmit unique waveforms;
   $N_R$ receive antenna elements, where $N_R$ is a positive integer and where each of the $N_R$ receive antenna elements receives at least one of the $N_T$ unique waveforms; and
   $N_R$ processing circuits electrically coupled to the $N_R$ antenna elements, the $N_R$ processing circuits receiving an electrical signal from at least one of the $N_R$ antenna elements, the electrical signal including at least one target signal and at least one interference signal and performing a first projection operation on the electrical signal to create a matched projection space parallel to a reference related to a target signal and a second projection operation on the electrical signal to create an orthogonal projection space that is orthogonal to, or nearly orthogonal to, the matched projection space, the orthogonal projection space including the interference signal, but not the target signal,
   wherein the at least one target signal is a reflected version of one of the unique waveforms,
   wherein at least one of the $N_R$ processing circuits uses the orthogonal projection space and the matched projection space to separate the interference signal from the target signal.

8. The system of claim 7, wherein unique waveforms from $N_T>1$ transmit antenna elements are used to determine a target angle and signals received at $N_R>1$ receive elements are used to cancel the interference signal.

9. The system of claim 7, wherein unique waveforms communicated from $N_T$ transmit antenna elements define a projection operation that includes a sequence of range resolution cells over a range window.

10. The system of claim 7, wherein at least one of the $N_T$ transmit antenna elements transmits a sequence of N unique waveforms and at least one of the $N_R$ processing circuits uses the N waveforms for Doppler processing.

11. The system of claim 10, wherein the at least one of the $N_T$ transmit antenna elements is used to determine target detection with at least $N_R>1$ processing circuits, and wherein the $N_R>1$ processing circuits are used to cancel the interference signal using Doppler processing.

12. The system of claim 7, wherein each projection operation uses one of code division multiple access (CDMA) time slots, time division multiple access (TDMA) time slots, or frequency division multiple access (FDMA) frequencies.

13. The system of claim 7, wherein at least one of the $N_R$ processing circuits separates the interference signal from the target signal prior to formation of an image space.

14. The system of claim 7, wherein the at least one of the $N_R$ processing circuits separates the interference signal from the target signal after formation of an image space.

15. The system of claim 7, wherein at least one of the $N_R$ processing circuits executes one of a Minimum Variance Distortionless Response algorithm or a Generalized Sidelobe Canceller algorithm that has been modified to use a covariance derived from the orthogonal projection space.

16. The system of claim 7, wherein $N_T>1$ transmit elements are used to determine a target angle using relative phase determined by the $N_T$ unique waveforms received at each of the $N_R>1$ receive antenna elements and the $N_R>1$ receive antenna elements are used to cancel the at least one interference signal.

17. A method for mitigating electromagnetic interference, the method comprising:
   providing an array of transmit antenna elements where each transmit antenna element transmits uniquely identifiable waveforms;
   providing an array of receive antenna elements electrically coupled to processing circuits that receive an electrical signal from at least one of the receive antenna elements, the electrical signal including a target signal and at least one interference signal, where the target signal is a reflected version of the uniquely identifiable waveforms;
   performing a first projection operation on the electrical signal to create a matched projection space parallel to a reference related to the uniquely identifiable waveforms and a second projection operation on the electrical signal to create an orthogonal projection space that is orthogonal to, or nearly orthogonal to, the matched projection space, the orthogonal projection space including the interference signal, but not the target signal;
   using one of the processing circuits to separate the interference signal from the target signal.

18. The method of claim 17, wherein providing an array of $N_T$ transmit antenna elements, where $N_T$ is a positive integer and an array of $N_R$ receive antenna elements, where $N_R$ is a positive integer, enables angular resolution of $N_T-1$ targets while cancelling $N_R-1$ interference signal sources.

19. The method of claim 17, wherein providing an array of $N_T$ transmit antenna elements, where $N_T$ is a positive integer and an array of $N_R$ receive antenna elements, where $N_R$ is a positive integer, enables a respective processing circuit coupled to a non-collocated receiver antenna element to cancel $N_R-1$ interference signal sources while tracking $N_T-1$ targets.

20. The method of claim 17, wherein a respective processing circuit uses interferometric phase differences among $N_R$ distributed receive antennas receiving the $N_T$ uniquely identifiable waveforms, where $N_T$ and $N_R$ are positive integers, to determine a target angular location of at most $N_T-1$ cooperative targets in a first coordinate system.

* * * * *